US012155696B2

(12) United States Patent
Park et al.

(10) Patent No.: US 12,155,696 B2
(45) Date of Patent: Nov. 26, 2024

(54) METHOD AND APPARATUS FOR INTERNET PROTOCOL MULTIMEDIA SUBSYSTEM (IMS) SIGNALING FOR NON-SERVICE ATTEMPT

(71) Applicant: LG ELECTRONICS INC., Seoul (KR)

(72) Inventors: Sangmin Park, Seoul (KR); Sungduck Chun, Seoul (KR); Laeyoung Kim, Seoul (KR); Myungjune Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 353 days.

(21) Appl. No.: 17/628,851

(22) PCT Filed: Aug. 4, 2020

(86) PCT No.: PCT/KR2020/010267
§ 371 (c)(1),
(2) Date: Jan. 20, 2022

(87) PCT Pub. No.: WO2021/025430
PCT Pub. Date: Feb. 11, 2021

(65) Prior Publication Data
US 2022/0263874 A1      Aug. 18, 2022

(30) Foreign Application Priority Data

Aug. 7, 2019   (KR) .................. 10-2019-0096050

(51) Int. Cl.
*H04L 65/1016*      (2022.01)
*H04L 65/1073*      (2022.01)
(Continued)

(52) U.S. Cl.
CPC ...... *H04L 65/1016* (2013.01); *H04L 65/1073* (2013.01); *H04W 48/16* (2013.01); *H04W 80/10* (2013.01)

(58) Field of Classification Search
CPC . H04L 65/1016; H04L 65/1073; H04L 61/00; H04L 65/1104; H04W 80/10;
(Continued)

(56) References Cited

U.S. PATENT DOCUMENTS

2020/0336953 A1* 10/2020 Liu .................. H04W 48/02
2021/0051540 A1*  2/2021 Lotfallah ............ H04W 36/08
(Continued)

FOREIGN PATENT DOCUMENTS

| KR | 10-2019-0028282 A | 3/2019 | |
|---|---|---|---|
| WO | WO-2018204609 A1 * | 11/2018 | ............ H04W 48/02 |
| WO | 2019/032798 A1 | 2/2019 | |

OTHER PUBLICATIONS

NPL Document, "Discussion on enhanced access control for IMS signalling", Montreal, Canada. Feb. 25, 2019 (Year: 2019).*
Huawei et al., "Discussion on enhanced access control for IMS signalling", C1-191287, 3GPP TSG CT WG1 Meeting #115, Montreal (Canada), Feb. 25-Mar. 1, 2019, see sections 2.1 and 3.
(Continued)

Primary Examiner — Mewale A Ambaye
(74) Attorney, Agent, or Firm — BRYAN CAVE LEIGHTON PAISNER LLP

(57) ABSTRACT

A disclosure of the present specification provides a method for a terminal to perform communication related to an IMS. The method may comprise the steps of: receiving, by an NAS layer of a terminal, a first request message from an IMS layer of the terminal, wherein the first request message includes information related to IMS signaling for a non-service attempt and information about a first access category among a plurality of access categories related to an IMS service, and the IMS signaling for the non-service attempt is signaling which does not request the IMS service; and
(Continued)

transmitting, by the NAS layer of the terminal, a second request message including the information about the first access category to an RRC layer of the terminal.

16 Claims, 18 Drawing Sheets

(51) Int. Cl.
*H04W 48/16* (2009.01)
*H04W 80/10* (2009.01)

(58) Field of Classification Search
CPC ..... H04W 60/04; H04W 48/02; H04W 88/02; H04B 1/7075
See application file for complete search history.

(56) References Cited

U.S. PATENT DOCUMENTS

| | | | |
|---|---|---|---|
| 2021/0250890 A1* | 8/2021 | Won | H04W 48/16 |
| 2021/0337625 A1* | 10/2021 | Tsai | H04W 76/19 |
| 2022/0132596 A1* | 4/2022 | Jeon | H04W 74/0866 |
| 2022/0322482 A1* | 10/2022 | Xu | H04W 76/27 |

OTHER PUBLICATIONS

Intel Corporation, "On IMS registration/re-registration and ACB skip", C1-170088, 3GPP TSG CT WG1 Meeting #101bis, Spokane (WS), USA, Jan. 16-20, 2017, see section 2.

Ericsson, "Access Control for NR", R2-1710478, 3GPP TSG-RAN WG2 #99bis, Prague, Czech Republic, Oct. 9-13, 2017, see section 2.

* cited by examiner

METHOD AND APPARATUS FOR INTERNET PROTOCOL MULTIMEDIA SUBSYSTEM (IMS) SIGNALING FOR NON-SERVICE ATTEMPT

This application is the National Stage filing under 35 U.S.C. 371 of International Application No. PCT/KR2020/010267, filed on Aug. 4, 2020, which claims the benefit of and priority to Korean Application No. 10-2019-0096050, filed on Aug. 7, 2019, the contents of which are all hereby incorporated by reference herein in their entirety.

TECHNICAL FIELD

The present disclosure relates to mobile communication.

BACKGROUND

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

For the fifth-generation (so called 5G) mobile communication, a new radio access technology (New RAT or NR) have been studied and researched.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

A terminal using a 3rd Generation Partnership Project (3GPP) system including LTE and 5G may be provided with IMS (IP Multimedia Subsystem) services such as voice call, video call, and Short Message Service (SMS) (eg, SMS over IP (Internet Protocol)).

There may be a case in which the IMS layer of this terminal delivers IMS signaling for non-service attempts, which is not for actual attempts related to IMS service, (eg, IMS signaling for purposes such as initial registration, re-registration, and subscription refresh) to the IMS network. In this case, the IMS layer of the terminal may transmit IMS signaling for non-service attempt to the RRC layer of the terminal through the NAS layer of the terminal, and the RRC layer of the terminal may transmit it to the network.

If access control is being applied to the network and/or the terminal due to network congestion, etc., the RRC layer of the terminal performs an access control check for IMS signaling for a non-service attempt based on the access category. A separate access category for IMS signaling for non-service attempts has not been defined, and IMS signaling for non-service attempts uses an access category for general transmission data (eg, access category 7 for Mobile Originating (MO) data), which has a lower priority compared to other access categories, so it is highly likely to be barred by the RRC layer.

As described above, when IMS signaling for a non-service attempt is barred, a problem may occur in that the terminal cannot register with the IMS network, so that the terminal is not provided with the IMS service. Conventionally, a method for increasing the possibility that IMS signaling for non-service attempts is not barred by access control has not been discussed.

SUMMARY

Accordingly, a disclosure of the present specification has been made in an effort to solve the aforementioned problem.

In order to solve the above-mentioned problems, one disclosure of the present specification provides a method for a terminal to perform IMS-related communication. The method may includes: receiving, by a NAS layer of a terminal, a first request message from an IMS layer of the terminal, wherein the first request message includes information related to IMS signaling for non-service attempts and information on the first access category among a plurality of access categories related to IMS services, and the IMS signaling for the non-service attempt is signaling that does not request an IMS service; and transmitting, by the NAS layer of the terminal, a second request message including information on the first access category to the RRC layer of the terminal.

In order to solve the above problems, one disclosure of the present specification provides a wireless communication device. The wireless communication device includes at least one processor; and at least one memory that stores instructions and is operably electrically connectable with the at least one processor, wherein the operations performed based on the instructions being executed by the at least one processor may include: receiving, by a NAS layer of a wireless communication device, a first request message from an IMS layer of the wireless communication device, wherein the first request message includes information related to IMS signaling for non-service attempts and information on the first access category among a plurality of access categories related to IMS services, and the IMS signaling for the non-service attempt is signaling that does not request an IMS service; and transmitting, by the NAS layer of the wireless communication device, a second request message including information on the first access category to the RRC layer of the wireless communication device.

In order to solve the above problems, one disclosure of the present specification provides an apparatus in mobile communication. The apparatus includes at least one processor; and at least one memory for storing instructions and operably electrically connectable with the at least one processor, wherein the operations performed based on the instructions being executed by the at least one processor may include: identifying a first request message, wherein the first request message includes information related to IMS signaling for a non-service attempt and information about a first access category among a plurality of access categories related to an IMS service, and the non-service IMS signaling for an attempt is signaling that does not request an IMS service; and generating a second request message including information on the first access category.

In order to solve the above problems, one disclosure of the present specification provides a non-volatile computer-readable storage medium recording instructions. The instructions, when executed by one or more processors, may cause the one or more processors to: identifying a first request message, wherein the first request message includes information related to IMS signaling for a non-service attempt and information about a first access category among a plurality of access categories related to an IMS service, and the non-service IMS signaling for an attempt is signaling that does not request an IMS service; and generating a second request message including information on the first access category.

Accordingly, a disclosure of the present specification has been made in an effort to solve the aforementioned problem.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

DESCRIPTION OF EXEMPLARY EMBODIMENTS

Figure 1:
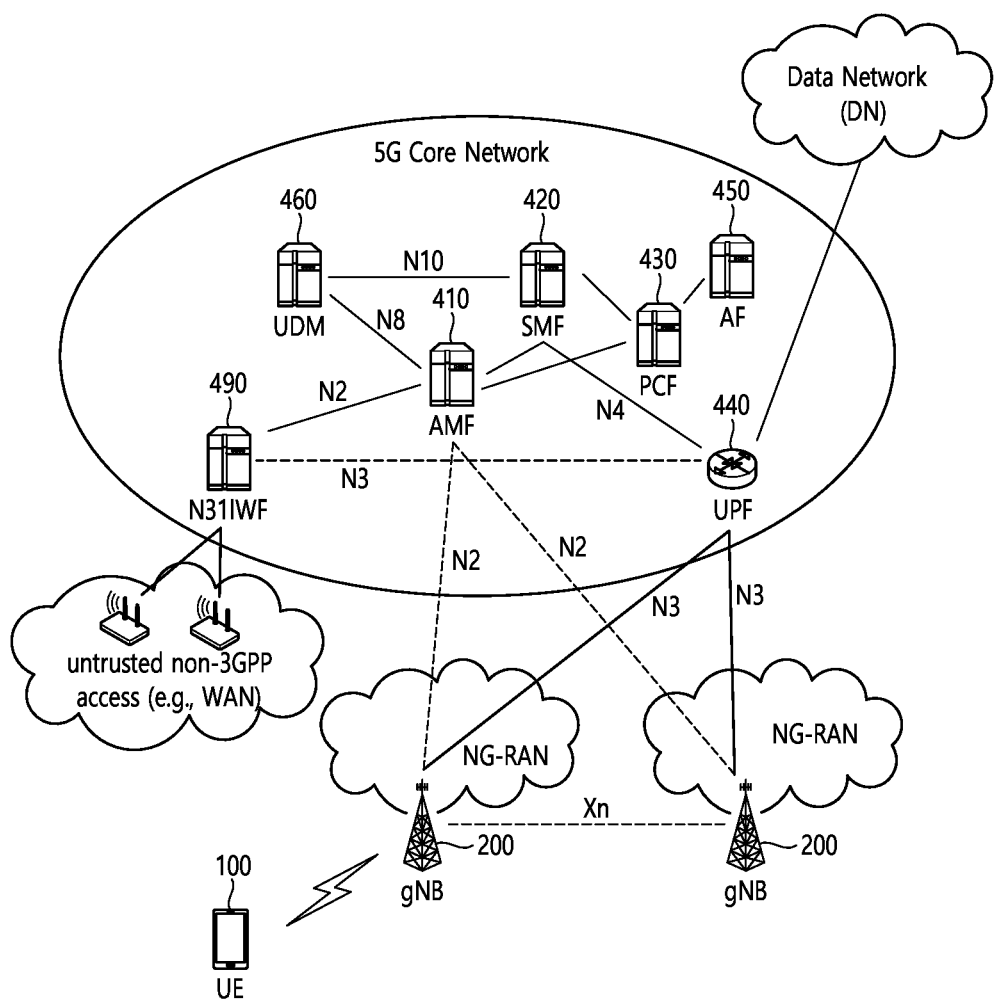
FIG. 1 is a structural diagram of a next-generation mobile communication network.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

As used herein, "A or B" may mean "only A", "only B", or "both A and B". In other words, "A or B" herein may be understood as "A and/or B". For example, "A, B or C" herein means "only A", "only B", "only C", or any combination of A, B and C (any combination of A, B and C)".

As used herein, a slash (/) or a comma may mean "and/or". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B", or "both A and B". In addition, the expression "at least one of A or B" or "at least one of A and/or B" may be understood as "At least one of A and B".

In addition, in this specification, "at least one of A, B and C" may mean "only A", "only B", "only C", or "any combination of A, B and C". In addition, "at least one of A, B or C" or "at least one of A, B and/or C" may mean "at least one of A, B and C".

In addition, the parentheses used herein may mean "for example". In detail, when "control information (PDCCH (Physical Downlink Control Channel))" is written herein, "PDCCH" may be proposed as an example of "control information". In other words, "control information" of the present specification is not limited to "PDCCH", and "PDDCH" may be proposed as an example of "control information". In addition, even when "control information (i.e. PDCCH)" is written, "PDCCH" may be proposed as an example of "control information".

The technical features individually described in one drawing in this specification may be implemented separately or at the same time.

In the accompanying drawings, a user equipment (UE) is illustrated by way of example, but the illustrated UE may also be referred to in terms of UE 100 (terminal), mobile equipment (ME), and the like. In addition, the UE may be a portable device such as a notebook computer, a mobile phone, a PDA, a smartphone, or a multimedia device or may be a non-portable device such as a PC or vehicle-mounted device.

Hereinafter, the UE is used as an example of a wireless communication device (or a wireless device, or a wireless device) capable of wireless communication. An operation performed by the UE may be performed by a wireless communication device. A wireless communication device may also be referred to as a wireless device, a wireless device, or the like. Hereinafter, AMF may mean an AMF node, SMF may mean an SMF node, and UPF may mean a UPF node.

A base station, a term used below, generally refers to a fixed station that communicates with a wireless device, and may be called other terms such as an evolved-NodeB (eNodeB), an evolved-NodeB (eNB), a BTS (Base Transceiver System), an access point (Access Point) and gNB (Next generation NodeB).

FIG. 1 is a structural diagram of a next-generation mobile communication network.

5GC (5G Core) may include various components, part of which are shown in FIG. 1, including an access and mobility management function (AMF) 41, a session management function (SMF) 42, a policy control function (PCF) 43, a User Plane Function (UPF) 44, an application function (AF) 45, a unified data management (UDM) data network 46, and a non-3GPP interworking function (N3IWF) 49.

A UE 10 is connected to a data network via the UPF 44 through a Next Generation Radio Access Network (NG-RAN) including the gNB 20.

The UE 10 may be provided with a data service even through untrusted non-3GPP access, e.g., a wireless local area network (WLAN). In order to connect the non-3GPP access to a core network, the N3IWF 49 may be deployed.

The illustrated N3IWF 49 performs a function of managing interworking between the non-3GPP access and the 5G system. When the UE 10 is connected to non-3GPP access (e.g., WiFi referred to as IEEE 801.11), the UE 10 may be connected to the 5G system through the N3IWF 49. The N3IWF 49 performs control signaling with the AMF 41 and is connected to the UPF 44 through an N3 interface for data transmission.

The illustrated AMF 41 may manage access and mobility in the 5G system. The AMF 41 may perform a function of managing NAS security. The AMF 41 may perform a function of handling mobility in an idle state.

The illustrated UPF 44 is a type of gateway through which user data is transmitted/received. The UPF 44 may perform the entirety or a portion of a user plane function of a serving gateway (S-GW) and a packet data network gateway (P-GW) of 4G mobile communication.

The UPF 44 operates as a boundary point between a next generation radio access network (NG-RAN) and the core network and maintains a data path between the gNB 20 and the SMF 42. In addition, when the UE 10 moves over an area served by the gNB 20, the UPF 44 serves as a mobility anchor point. The UPF 44 may perform a function of handling a PDU. For mobility within the NG-RAN (which is defined after 3GPP Release-15), the UPF 44 may route packets. In addition, the UPF 54 may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF 44 may correspond to a termination point of a data interface toward the data network.

The illustrated PCF 43 is a node that controls an operator's policy.

The illustrated AF 45 is a server for providing various services to the UE 10.

The illustrated UDM 46 is a kind of server that manages subscriber information, such as home subscriber server (HSS) of 4G mobile communication. The UDM 46 stores and manages the subscriber information in a unified data repository (UDR).

The illustrated SMF 42 may perform a function of allocating an Internet protocol (IP) address of the UE. In addition, the SMF may control a protocol data unit (PDU) session.

For reference, hereinafter, reference numerals for AMF (41), SMF (42), PCF (43), UPF (44), AF (45), UDM (46), N3IWF (49), gNB (20), or UE (10) may be omitted.

The $5^{th}$ generation mobile communication supports a plurality of numerologies (e.g. a plurality of values of subcarrier spacing (SCS)) in order to support various services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

The NR frequency band is defined as two types of frequency ranges (FR1, FR2). FR1 is 410 MHz-7125 MHz, and FR2 is 24250 MHz-52600 MHz, which may mean millimeter wave (mmW). For convenience of explanation, among the frequency ranges used in the NR system, FR1 may mean "sub 6 GHz range" and FR2 may mean "above 6 GHz range" and may be called millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or higher included in FR1 may include an unlicensed band. The unlicensed band may be used for various purposes, for example, for communication for a vehicle (eg, autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 2:
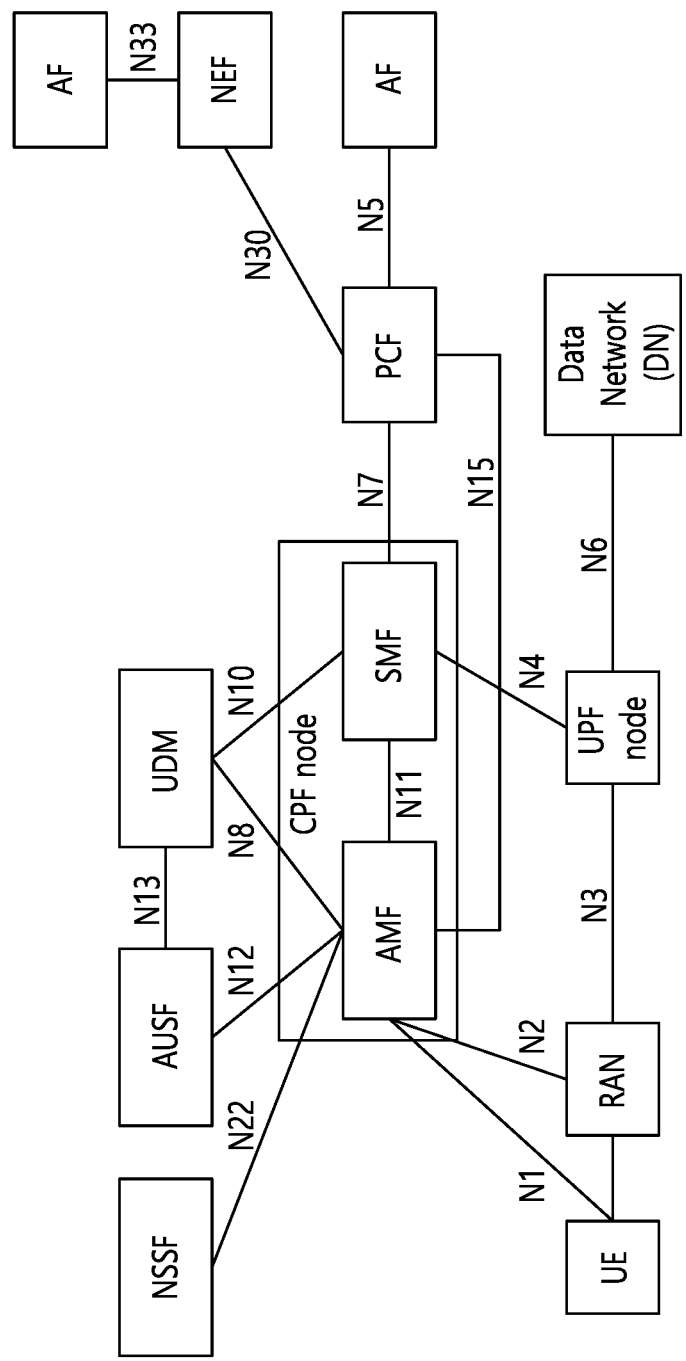
FIG. 2 is an exemplary diagram illustrating a predicted structure of a next generation mobile communication in terms of a node.

FIG. 2 is an exemplary diagram illustrating a predicted structure of a next generation mobile communication in terms of a node. Referring to FIG. 2, the UE is connected to a data network (DN) through a next generation RAN (Radio Access Network). The Control Plane Function (CPF) node shown in FIG. 2 may perform all or part of the Mobility Management Entity (MME) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the drawing is a type of a gateway over which user data is transmitted and received. The UPF node may perform all or part of the user plane functions of the S-GW and the P-GW of the fourth generation mobile communication.

The Policy Control Function (PCF) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

The illustrated Network Exposure Function (NEF) is a node for providing a mechanism to securely expose services and functions of the 5G core. For example, NEF exposes functions and events, securely provides information from external applications to the 3GPP network, translates internal/external information, provides control plane parameters, and manages packet flow description (PFD).

Figure 3:
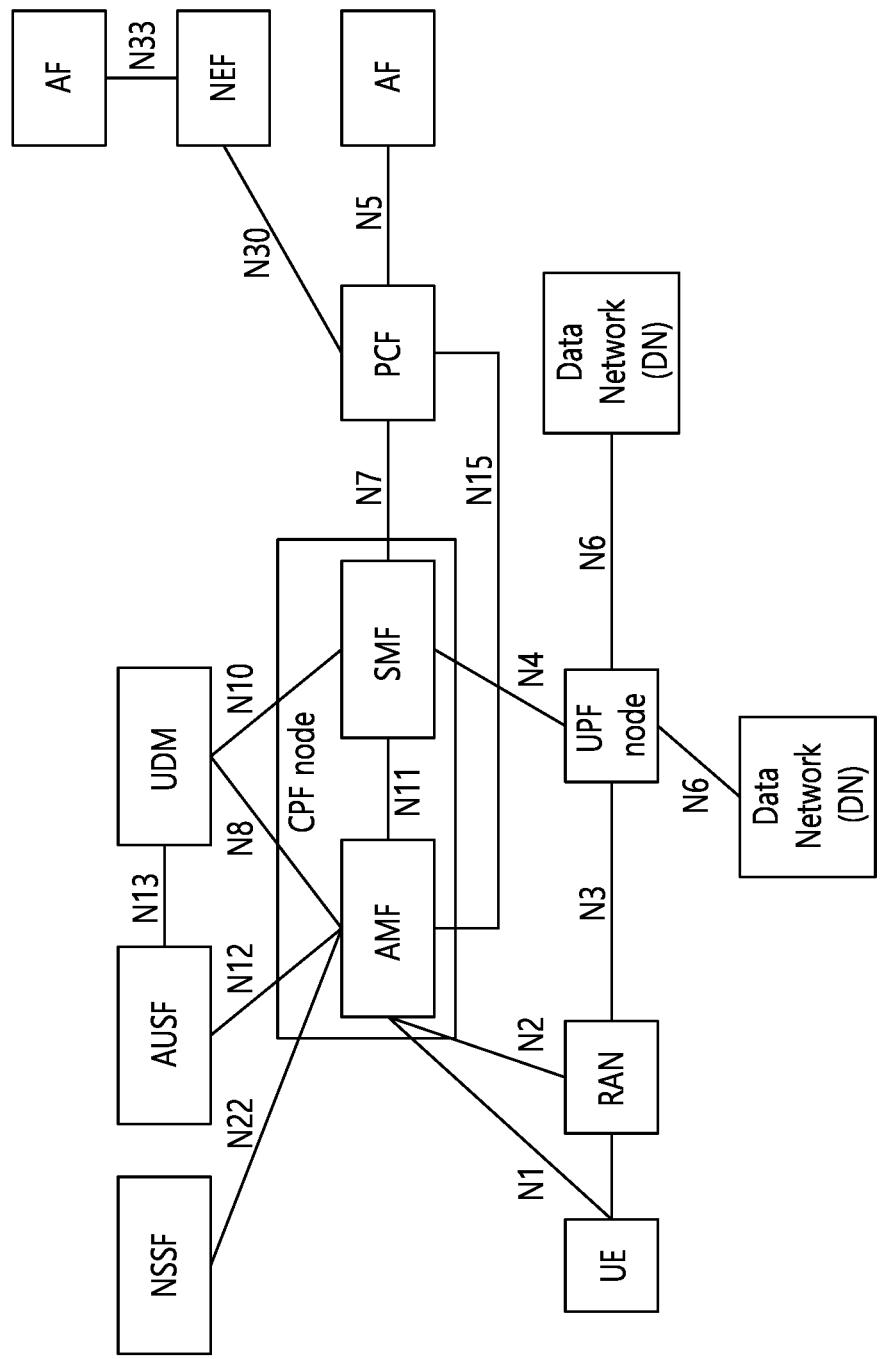
FIG. 3 is an exemplary diagram illustrating an architecture for supporting a concurrent access through two data networks.

In FIG. 3, the UE may simultaneously access two data networks using multiple PDU sessions.

FIG. 3 is an exemplary diagram illustrating an architecture for supporting a concurrent access through two data networks.

FIG. 3 illustrates an architecture that allows the UE to simultaneously access two data networks using one PDU session.

For reference, descriptions of the reference points shown in FIGS. 2 and 3 are as follows.

N1 represents Reference point between UE and AMF.
N2 represents Reference point between NG-RAN and AMF.
N3 represents Reference point between NG-RAN and UPF.
N4 represents Reference point between SMF and UPF.
N5 represents Reference point between PCF and AF.
N6 represents Reference point between UPF and DN.
N7 represents Reference point between SMF and PCF.
N8 represents Reference point between UDM and AMF.
N9 represents Reference point between UPFs.
N10 represents Reference point between UDM and SMF.
N11 represents Reference point between AMF and SMF.
N12 represents Reference point between AMF and AUSF.
N13 represents Reference point between UDM and AUSF.
N14 represents Reference point between AMFs.
N15 represents Reference point between PCF and AMF in a non-roaming scenario and reference point between AMF and PCF of visited network in roaming scenario.
N16 represents Reference point between SMFs.
N22 represents Reference point between AMF and NSSF.
N30 represents Reference point between PCF and NEF.
N33 represents Reference point between AF and NEF.

In FIGS. 2 and 3, AF by a third party other than an operator may be connected to 5GC through a network exposure function (NEF).

Figure 4:
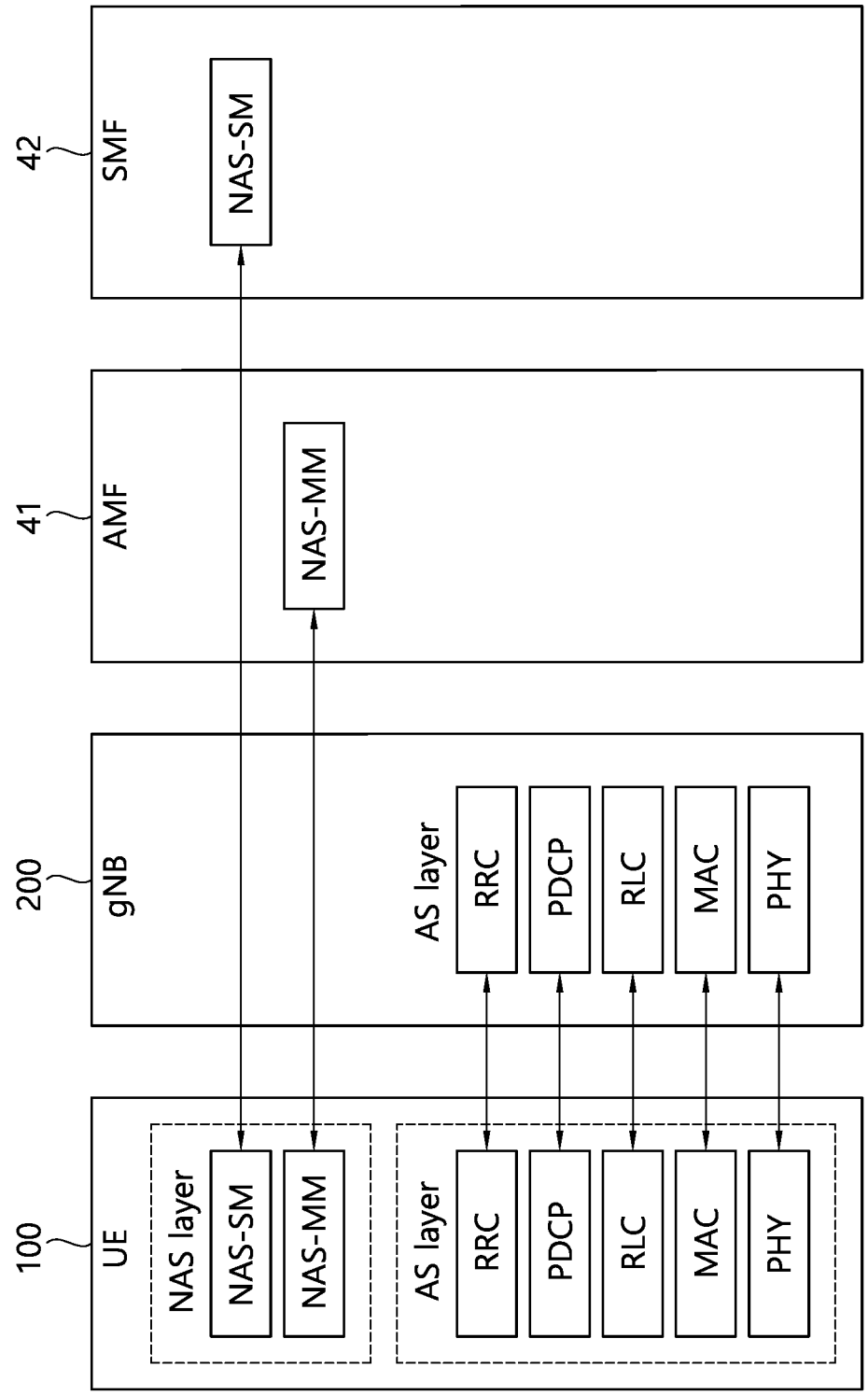
FIG. 4 is another exemplary diagram showing a structure of a radio interface protocol between a UE and a gNB.

FIG. 4 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a medium access control (MAC) layer, a radio link control (RLC) layer, and a packet data convergence protocol (PDCP) layer.

The third layer includes radio resource control (hereinafter abbreviated as RRC). The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The NAS layer performs functions such as connection management (session management) and mobility management.

The NAS layer is divided into a NAS entity for mobility management (MM) and a NAS entity for session management (SM).

1) NAS entity for MM provides the following functions in general.
   NAS procedures related to AMF include the following.
   Registration management and access management procedures. AMF supports the following functions.
   Secure NAS signal connection between UE and AMF (integrity protection, encryption)
2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,

The NAS entity for the MM creates a NAS-MM message that derives how and where to deliver an SM signaling message through a security header representing the NAS transmission of SM signaling and additional information on a received NAS-MM.

Upon receiving SM signaling, the NAS entity for the SM performs an integrity check of the NAS-MM message, analyzes additional information, and derives a method and place to derive the SM signaling message.

Meanwhile, in FIG. 4, the RRC layer, the RLC layer, the MAC layer, and the PHY layer located below the NAS layer are collectively referred to as an access stratum (AS).

A network system (ie, 5GC) for next-generation mobile communication (ie, 5G) also supports non-3GPP access. An example of the non-3GPP access is typically a WLAN access. The WLAN access may include both a trusted WLAN and an untrusted WLAN.

In the system for 5G, AMF performs registration management (RM: Registration Management) and connection management (CM: Connection Management) for 3GPP access as well as non-3GPP access.

A Multi-Access (MA) PDU session using both 3GPP access and non-3GPP access may be used.

The MA PDU session is a PDU session that can be serviced simultaneously with 3GPP access and non-3GPP access using one PDU session.

<Registration Procedure>

In order to allow mobility tracking and data reception to be performed, and in order to receive a service, the UE needs to gain authorization. For this, the UE shall register to a network. The registration procedure is performed when the UE needs to perform initial registration to a 5G system. Additionally, the Registration Procedure is performed when the UE performs periodic registration update, when the UE relocates to a new tracking area (TA) in an Idle state, and when the UE needs to perform periodic registration renewal.

During the initial registration procedure, an ID of the UE may be obtained from the UE. The AMF may forward (or transfer) a PEI (IMEISV) to a UDM, SMF, and PCF.

Figure 5A:
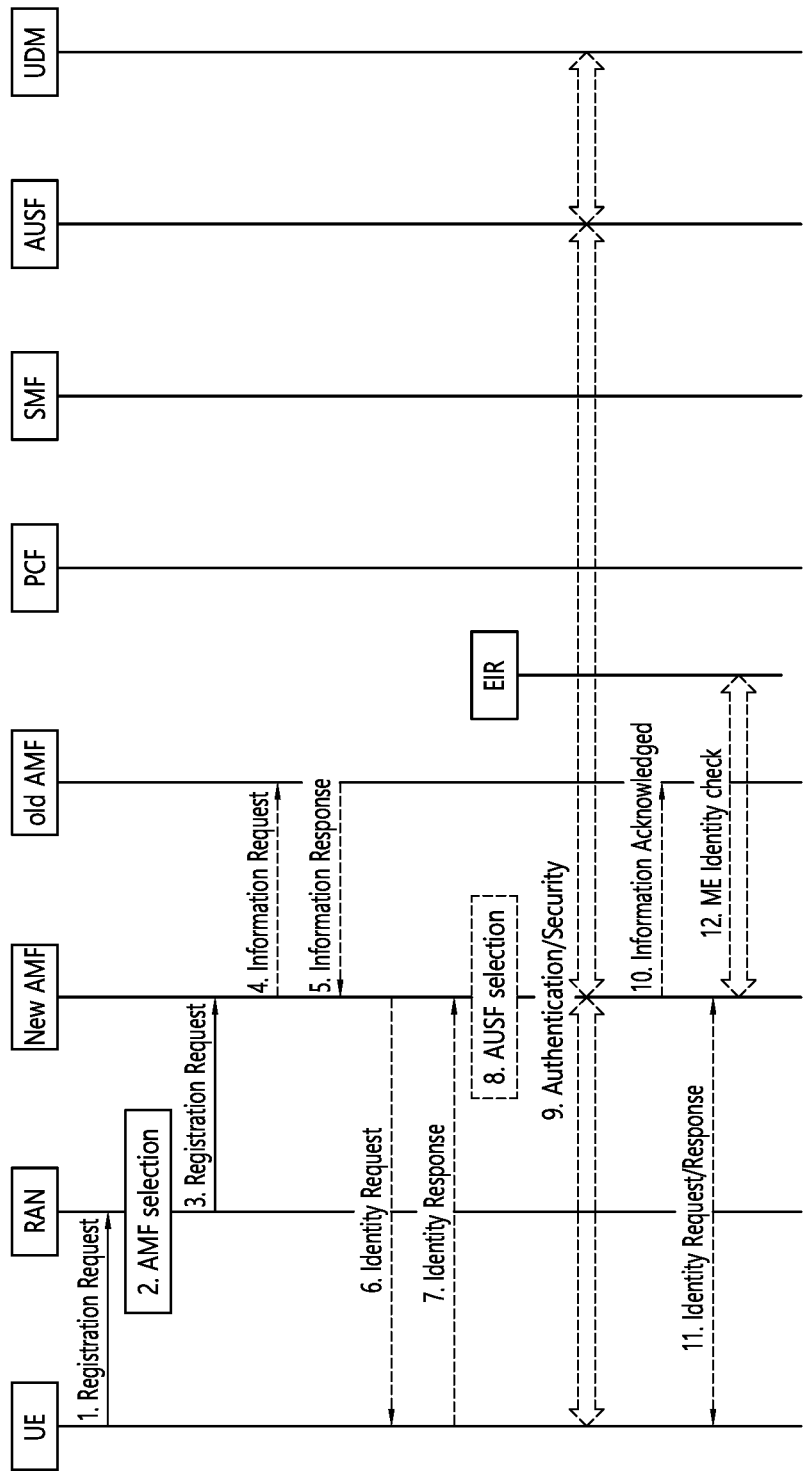
FIGS. 5a and 5b is a signal flow chart showing an exemplary registration procedure.
Figure 5B:
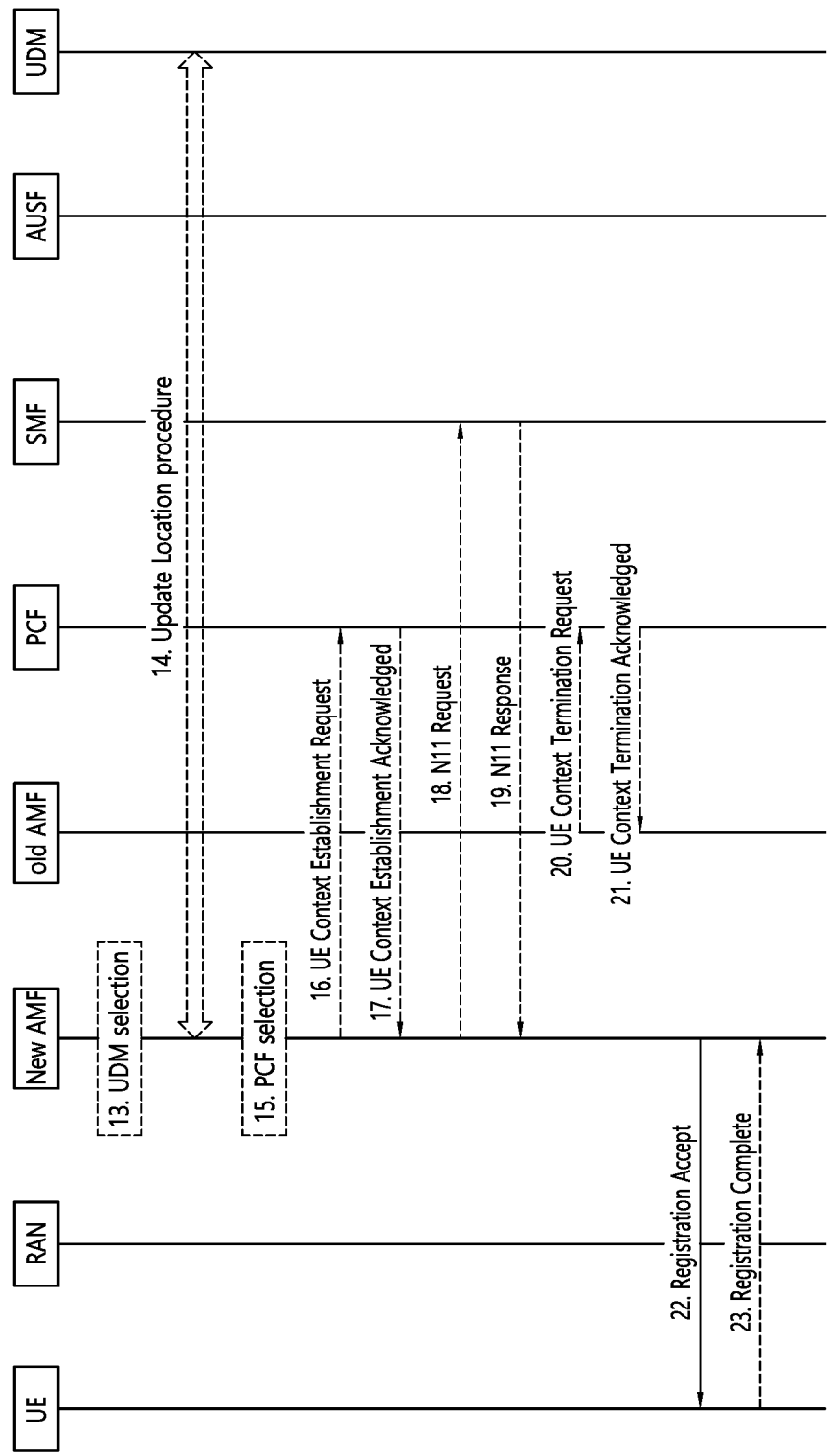

FIGS. 5a and 5b are signal flow charts showing an exemplary registration procedure.

1) The UE may transmit an AN message to the RAN. The AN message may include an AN parameter and a registration request message. The registration request message may include information, such as a register type, a subscriber permanent ID or temporary user ID, a security parameter, NASSAI, 5G capability of the UE, a PDU session status, and so on.

In case of a 5G RAN, the AN parameter may include a SUPI or a temporary user ID, a selected network, and NASSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a PLMN other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information of the allowed NSSAI and the mapped NSSAI. The allowed NSSAI information for the access type of the UE may be included in the N2 message including the registration accept message. The information of the mapped NSSAI is information that maps each S-NSSAI of the allowed NSSAI to the S-NASSI of the NSSAI configured for HPLMN.

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<PDU Session Establishment Procedure>

For the PDU Session Establishment procedure, two different types of PDU Session Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 6A:
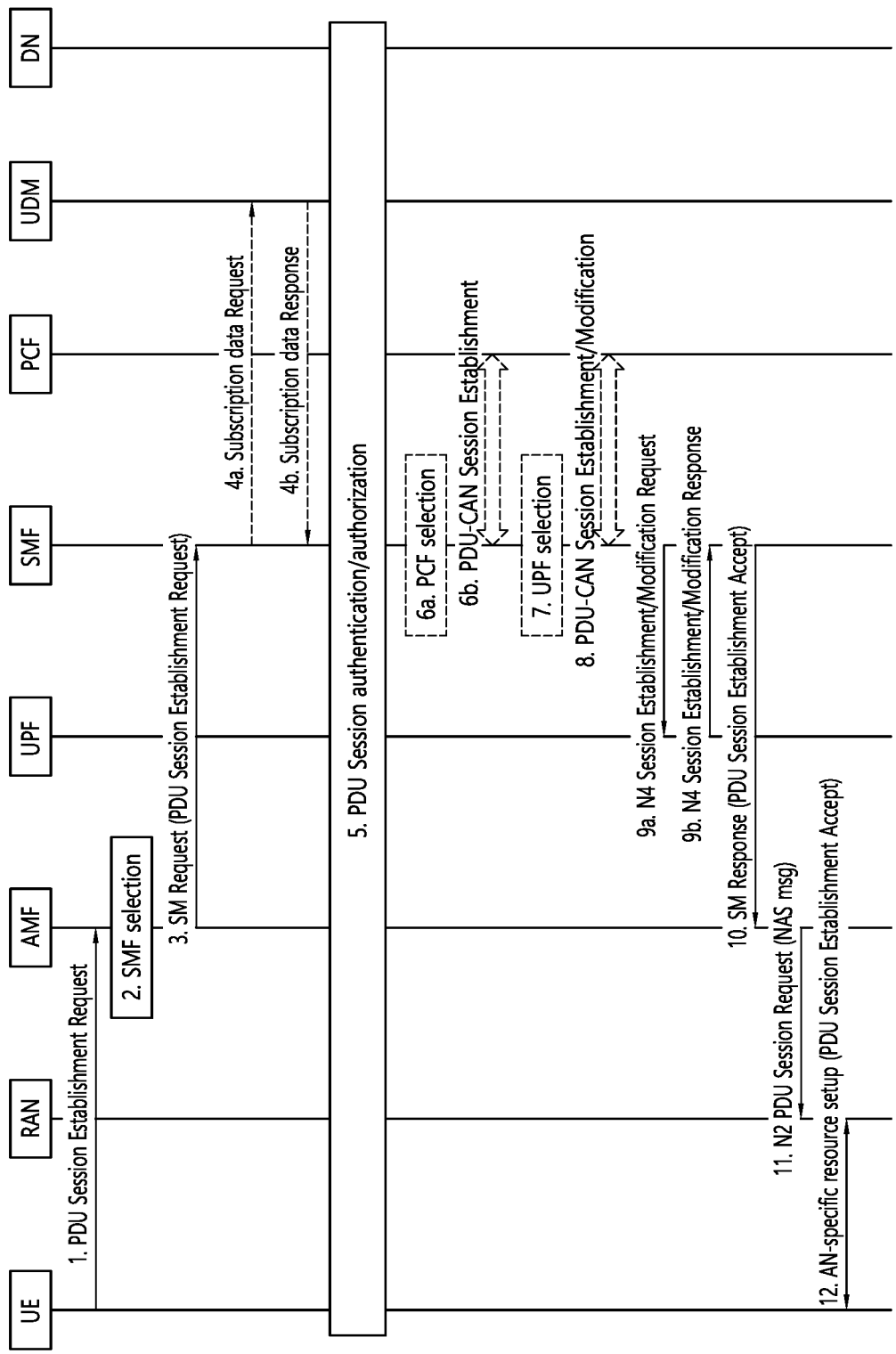
FIGS. 6A and 6B is a signal flowchart illustrating an exemplary PDU session establishment procedure.
Figure 6B:
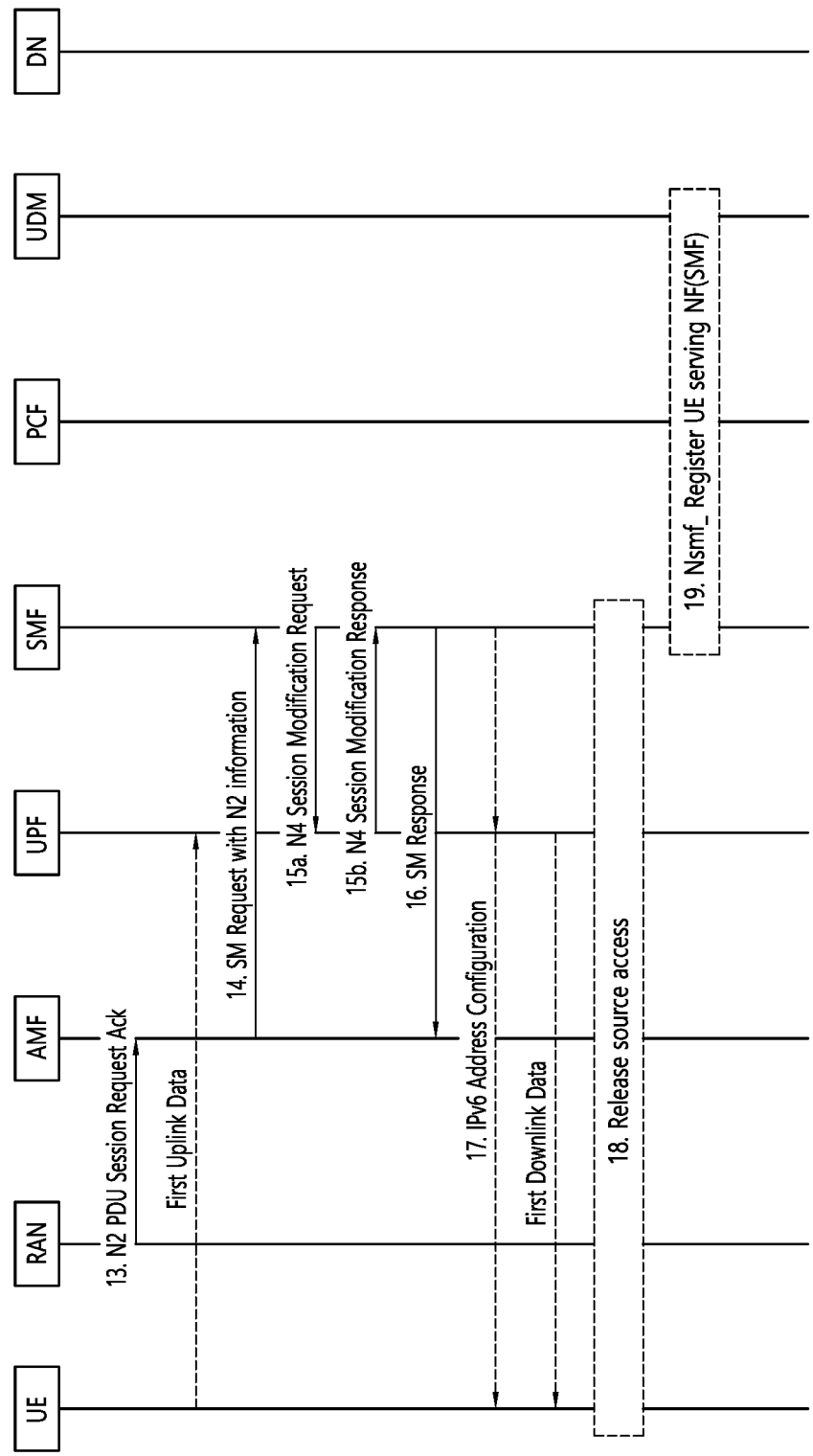

FIGS. 6A and 6B are a signal flowchart illustrating an exemplary PDU session establishment procedure.

The procedure shown in FIGS. 6A and 6B assumes that the UE has already registered on the AMF according to the registration procedure shown in FIGS. 5a and 5b. Therefore, it is assumed that the AMF has already acquired user subscription data from UDM.

1) The UE transmits a NAS message to the AMF. The message may include Single-Network Slice Selection Assistance Information (S-NSSAI), DNN, PDU session ID, a Request type, N1 SM information (including PDU Session Request), and so on.

Specifically, the UE includes the S-NSSAI from the allowed (allowed) NSSAI of the current access type. If information on the mapped NSSAI is provided to the UE, the UE may provide both the S-NSSAI based on the allowed NSSAI and the corresponding S-NSSAI based on the information of the mapped NSSAI. Here, the mapped NSSAI information is information that maps each S-NSSAI of the allowed NSSAI to the S-NASSI of the NSSAI configured for HPLMN.

More specifically, The UE may extract and store the information of the allowed S-NSSAI and the mapped S-NSSAI included in the registration accept message received from the network (ie, AMF) in the registration procedure of FIGS. 5a and 5b. Accordingly, the UE may transmit the PDU session establishment request message by including both the S-NSSAI based on the allowed NSSAI and the corresponding S-NSSAI based on the mapped NSSAI information.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

3) The AMF transmits an SM request message to the SMF. The SM request message may include a subscriber permanent ID, DNN, S-NSSAI, a PDU session ID, an AMD IF, N1 SM information, user location information, and an access technique type. The N1 SM information may include a PDU session ID and a PDU Session Establishment Request message.

The AMF ID is used for identifying an AMF providing services to the UE. The N1 SM information may include the PDU Session Establishment Request message, which is received from the UE.

4a) The SMF transmits a Subscriber Data Request message to the UDM. The Subscriber Data Request message may include a subscriber permanent ID and DNN.

In the above-described Process 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

4b) The UDM may transmit a Subscription Data Response message to the SMF.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits a message to the DN through a UPF.

More specifically, in case the SMF is required to authorize/authenticate a PDU session establishment, the SMT selects a UPF and triggers the PDU.

If the PDU Session Establishment authentication/authority assignment fails, the SMF ends the PDU Session Establishment procedure and notifies the rejection to the UE.

6a) If dynamic PCC is distributed, the SMF selects a PCF.

6b) The SMF may start a PDU-CAN session establishment towards the PCF in order to obtain a default PCC rule for the PDU session. In case the Request type indicates an "existing PDU session", the PCF may start a PDU-CAN session modification instead.

7) In case the Request type of Process 3 indicates an "initial request", the SMF selects an SSC mode for the PDU session. If Process 5 is not performed, the SMF may also select a UPF. In case of Request type IPv4 or IPv6, the SMF may allocate an IP address/prefix for the PDU session.

8) In case dynamic PCC is deployed and the PDU-CAN session establishment is not yet completed, the SMF may begin (or start) PDU-CAN Session Start.

9) In case the Request type indicates an "initial request", and in case Process 5 is not performed, the SMF may use the selected UPF and start an N4 Session Establishment procedure. And, otherwise, the SMF may use the selected and start an N4 Session Modification procedure.

9a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

9b) By transmitting an N4 Session Establishment/Modification response message, the UPF may respond. In case the CN tunnel information is allocated by the UPF, the CN tunnel information may be provided to the SMF.

10) The SMF transmits an SM response message to the AMF. The message may include a cause, N2 SM information, and N1 SM information. The N2 SM information may include a PDU session ID, a QoS profile, and CN tunnel information. The N1 SM information PDU Session Establishment Accept message. The PDU Session Establishment Accept message may include an allowed QoS rule, an SSC mode, S-NSSAI, and allocated IPv4 address.

As information that shall be forwarded to the RAN by the AMF, the N2 SM information may include the following.

CN Tunnel information: This corresponds to a core network address of an N3 tunnel corresponding to the PDU session.

QoS Profile: This is used for providing mapping between a QoS parameter and a QoS flow identifier (QFI) to the RAN.

PDU Session ID: This may be used for indicating a relation between AN resources for the UE and the PDU session to the UE via AN signaling for the UE.

Meanwhile, the N1 SM information includes a PDU Session Establishment Accept message that shall be provided to the UE by the AMF.

Multiple QoS rules may be included in the N1 SM information and the N2 SM information within the PDU Session Establishment Accept message.

The SM response message also includes information enabling the PDU session ID and AMF to determine not only which target UE to use but also which access is to be used for the UE.

11) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

12) The RAN may perform a specific signaling exchange with a UE being related to the information received from the SMF.

The RAN also allocates RAN N3 tunnel information for the PDU session.

The RAN forwards the NAS message, which is provided in Process 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

13) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

14) The AMF may transmit an SM Request message to the SMF. The SM Request message may include N2 SM information. Herein, the AMF may forward the N2 SM information received from the RAN to the SMF.

15a) In an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in Process 8.

15b) The UPF may transmit an N4 Session Establishment/Modification Response message to the SMF.

16) The SMF may transmit an SM Response message to the AMF. When this process is ended (or completed), the AMF may forward the related event to the SMF. This occurs during a handover, in which the RAN tunnel information is modified or the AMF is re-deployed.

17) The SMF transmits information to the UE through the UPF. More specifically, in case of PDU Type IPv6, the SMF may generate an IPv6 Router Advertisement and may transmit the generated advertisement to the UE through the N4 and UPF.

18) In case the PDU Session Establishment Request is caused by a handover between the 3GPP access and the non-3GPP access, i.e., if the Request type is configured as an "existing PDU session", the SMF releases the user plane through a source access (3GPP or non-3GPP access).

19) In case the ID of the SMF is not included in Process 4b by the UDM of the DNN subscription context, the SMF may call (or page or summon) a "UDM_Register UE serving NF service" including an SMF address and DNN. The UDM may store the ID, address, and DNN of the SMF.

During the procedure, if the PDU Session Establishment is not successful, the SMF notifies this to the AMF.

I. Techniques and Procedures Applicable to the Disclosure of this Specification

<Unified Access Aontrol>

When congestion occurs in the 5G system, depending on operator policies, deployment scenarios, subscriber profiles, and available services, different criteria may be used to determine which access attempt should be allowed or blocked. These different criteria for access control relate to Access Identities and Access Categories. The 5G system can provide a single unified access control where operators control access based on access ID and access category.

In unified access control, each access attempt may be categorized into one or more access IDs and one access category. Based on the access control information available for the access ID corresponding to the access attempt and the access category corresponding to the access attempt, the terminal (eg, UE) may test whether an actual access attempt can be made.

Unified access control supports extensibility to include additional standardized access IDs and additional standardized access categories. In addition, the unified access control supports the flexibility of an operator to define an access category using the operator's own criteria (criterion).

Based on the operator's policy, the 5G system may prevent a terminal (eg, UE) from accessing the network by using an access ID and related barring parameters that vary depending on the access category.

Here, the access ID may be configured in the UE as in the example of Table 3 below. An access category may be defined as a combination of a UE-related condition and an access attempt type, as shown in Table 4 below. One or more access IDs and one access category may be selected and tested for access attempts.

Table 3 below shows an example of an access ID that can be configured in the UE.

TABLE 3

| Access Identity number | UE configuration |
| --- | --- |
| 0 | UE is not configured with any parameters from this table. |
| 1 (NOTE 1) | UE is configured for Multimedia Priority Service (MPS). |
| 2 (NOTE 2) | UE is configured for Mission Critical Service (MCS). |
| 3-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |
| 14 (NOTE 3) | Access Class 14 is configured in the UE. |
| 15 (NOTE 3) | Access Class 15 is configured in the UE. |

(NOTE 1):
Access ID 1 may be used by UEs configured for MPS in PLMNs for which configuration is valid. PLMNs for which configuration is valid may be HPLMNs, PLMNs equivalent to HPLMNs, and visted PLMNs of home country. Access ID 1 may also be valid when the UE is explicitly authenticated based on the obtained PLMN established inside and outside of the UE.
(NOTE 2):
Access ID 2 may be used by a UE configured for MCS in PLMNs for which configuration is valid. PLMNs for which configuration is valid may be HPLMNs, PLMNs equivalent to HPLMNs, and visited PLMNs of home country. Access ID 2 may also be valid when the UE is explicitly authenticated based on the obtained PLMN established inside and outside of its own country.
(NOTE 3):
Access IDs 11 and 15 may be valid in the Home PLMN when an Equivalent HPLMN (EHPLMN) list does not exist, or may be valid in any EHPLMN. Access IDs 12, 13 and 14 can only be valid in their Home PLMN and visited PLMNs. To this end, a home country may be defined as a country of a mobile country code (MCC) part of an international mobile subscriber identity (IMSI).

Table 4 below shows examples of access categories that can be defined by a combination of conditions related to the UE and types of access attempts.

TABLE 4

| Access Category number | Conditions related to UE | Type of access attempt |
| --- | --- | --- |
| 0 | All | MO(Mobile Originating) signaling resulting from paging |

TABLE 4-continued

| Access Category number | Conditions related to UE | Type of access attempt |
|---|---|---|
| 1 (NOTE 1) | The UE is configured for a delay tolerant service, and may be a target of access control for access category 1 (a target of access control determined according to the relationship between the HPLMN of the UE and the selected PLMN). | All except for Emergency |
| 2 | All | Emergency |
| 3 | All except the conditions of access category 1 | NAS level MO signaling due to non-paging |
| 4 | All except the conditions of access category 1 | MMTEL(multimedia telephony) voice (NOTE 3) |
| 5 | All except the conditions of access category 1 | MMTEL video |
| 6 | All except the conditions of access category 1 | SMS |
| 7 | All except the conditions of access category 1 | MO data that does not belong to any other access category (NOTE 4) |
| 8 | All except the conditions of access category 1 | RRC level MO signaling due to non-paging consequences |
| 9-31 | | Reserved standardized Access Categories |
| 32-63 (NOTE 2) | All | Can be configured based on business classification |

(NOTE 1):
A barring parameter for access category 1 may be accompanied by information defining whether it applies to a UE in one of the following categories:
a) UEs configured for delay tolerance service;
b) UEs that are configured for delay tolerance service and are not in HPLMN or PLMN equivalent to HPLMN;
c) UEs that are configured for delay tolerant service and are neither in the PLMN listed as "most preferred PLMN" of the country where the UE is roaming in the operator-defined PLMN selector list on the SIM/USIM, nor in their HPLMN nor in a PLMN that is equivalent to their HPLMN.
When a UE is configured for EAB, the UE is also configured for delay tolerant service. In case a UE is configured both for EAB and for EAB override, when upper layer (e.g. application layer) indicates to override Access Category 1, then Access Category 1 is not applicable.
If both an access category based on operator classification and an access category based on standardized access category, which are used for classifying the access attempt, exist, and the standardized access category is not 0 or 2, the UE applies the access category based on the operator classification. When both an access category based on operator classification and an access category based on a standardized access category, into which an access attempt can be classified, exist, and the standardized access category is 0 or 2, the UE applies the standardized access category.
(NOTE 3):
Includes Real-Time Text (RTT).
(NOTE 4):
Includes IMS Messaging.

The 5G network may broadcast barring control information in one or more areas of the RAN. The barring control information may be, for example, an access ID and a list of barring parameters related to an access category. The UE may determine whether a particular new access attempt is allowed based on the barring parameter (the UE receives from the broadcast barring control information) and the UE's settings. In the case of a plurality of core networks sharing the same RAN, the RAN may apply access control to different core networks individually.

The unified access control framework may be applicable to both a UE accessing 5G CN (Core Network) using E-UTRA and a UE accessing 5G CN using NR.

The unified access control framework is applicable to the UE in the RRC (Radio Resource Control) Idle state, RRC Inactive (inactive) state and RRC Connected state when the UE initiates a new access attempt (eg, a new session request).

For reference, "new session request" in the RRC Connected state may mean an event. For example, an event may be a new MMTEL voice session, a MMTEL video session, transmission of SMS (SMS over IP, or SMS over NAS), establishment of a new PDU session, modification of an existing PDU session, and a service request for re-establishing user plane for an existing PDU session.

5G systems may support means by which operators may define operator-defined access categories as mutually exclusive. For example, examples of criteria for operator-defined access categories may be network slicing, applications, and application servers.

The unified access control framework may be applicable to inbound roamers to the PLMN.

The serving PLMN may provide the definition of operator-defined access categories to the UE.

If the UE needs to access 5GS (5G System), the UE may first determine whether access is allowed by performing an access control check (access control check). Access control checks can be performed on access attempts defined by a list of events such as:
  a) when the UE is in 5GMM (5GS Mobility Management)-IDLE mode through 3GPP access, and an event requiring a transition to 5GMM-CONNECTED mode occurs; and
  b) the UE is in 5GMM-CONNECTED mode via 3GPP access, or in 5GMM-CONNECTED mode with an RRC inactivity indication, and one of the following events occurs:
   b-1) When NAS layer (eg, 5GMM) of the terminal receives MO-MMTEL-voice-call-started information/indication, MO-MMTEL-video-call-started information/indication or MO-SMSoIP-attempt-started information/indication from an upper layer (eg, application layer);
   b-2) When NAS layer (eg, 5GMM) of the terminal receives a request, for transmitting a mobile originated SMS over NAS, from a higher layer (eg, application layer), and the request does not trigger a service request to switch the UE from 5GMM-IDLE mode to 5GMM-CONNECTED mode;

b-3) When the NAS layer (eg, 5GMM) of the terminal receives a request for transmitting a UL NAS TRANSPORT message for the purpose of establishing a PDU session from an upper layer (eg, an application layer), and the request does not trigger a service request to switch the UE from 5GMM-IDLE mode to 5GMM-CONNECTED mode;

b-4) When the NAS layer (eg, 5GMM) of the terminal receives a request for transmitting a UL NAS TRANSPORT message for the purpose of PDU session modification from an upper layer (eg, application layer), and the request does not trigger a service request to switch the UE from 5GMM-IDLE mode to 5GMM-CONNECTED mode;

b-5) when the NAS layer (eg, 5GMM) of the terminal receives a request for re-establishing a user-plane resource for an existing (existing) PDU session; and When the NAS layer (eg, 5GMM) of the terminal is notified that the uplink user data packet will be transmitted for the PDU session with the deferred user-plane resource.

When the NAS layer of the terminal detects one of the above-described events, the NAS layer of the terminal may perform an operation of mapping one or more access IDs and types of requests to access categories. In addition, a lower layer (e.g. an RRC layer) of the terminal may perform an access barring check for the request based on the determined access ID and access category. For reference, the NAS layer of the terminal may recognize the above-described events through information/indication provided from a higher layer and/or when determining that it is necessary to start a normal NAS operation.

In order to determine the access ID and access category of the request, the NAS layer of the terminal may check a set of access IDs and a reason for access related to the set of access categories (reason for access), the type of service requested and a profile of the UE including UE settings. Here, an example of the set of access IDs and the set of access categories is as follows:

A set of standardized access IDs;
A set of standardized access categories; and
A set of operator-defined access categories, if available.

When a terminal (eg, UE) needs to initiate an access attempt for one of the events such as in the examples a) to b-6) above, the terminal may determine one or more access IDs related to the access attempt from a set of standardized access IDs, and the terminal mat determine one access category related to the access attempt among a set of standardized access categories and a set of operator-defined access categories.

For example, the set of accessible (applicable) access ID for a request related to an access attempt may be determined by the terminal (eg, UE) in the following manner:

i) In the example of Table 3, for each of the access IDs 1, 2, 11, 12, 13, 14 and 15, the UE may check whether the access ID is available in the selected PLMN when a new PLMN is selected. or the UE may check whether the access ID is applicable to the RPLMN or equivalent PLMN; and ii) When there is no usable access ID among the access IDs 1, 2, 11, 12, 13, 14, and 15, the access ID 0 can be used.

In order to determine the available access category for the access attempt, the NAS layer of the terminal checks the rules as in the example in Table 5 below, and the NAS layer of the terminal may use the matching access category for a barring check (barring check).

Table 5 below is an example of a rule used when the NAS layer of the terminal determines the available access category for the access attempt.

TABLE 5

| Rule # (Rule Number) | Type of access attempt | Requirements to be met | Access category |
|---|---|---|---|
| 1 | response to notifications via paging or non-3GPP access; 5GMM connection management procedure initiated for the purpose of delivering LTE Positioning Protocol (LPP) messages | Access attempt is for MT access | 0 (= MT_acc) |
| 2 | Emergency | UE attempts to access an emergency session (NOTE 1, NOTE 2) | 2 (= emergency) |
| 3 | Attempts to access operator-defined access categories | The UE currently stores valid operator-defined access category definitions within the current PLMN, and the access attempt matches the criteria of the operator-defined access category definition. | 32-63 (= based on operator classification) |
| 4 | Access attempt for delay tolerant service | (a) UE is configured for NAS signalling low priority or US supporting S1 mode is configured for EAB (Extended Access Barring) to which "EAB override" is not applied. (b) the UE received one of the categories a, b or c as part of the parameters for unified access control in the broadcast system information(e.g. broadcasted barring control information), and the UE is a member of the broadcasted category in the selected PLMN or RPLMN/equivalent PLMN (NOTE 3, NOTE 5, NOTE 6) | 1 (= delay tolerant) |

TABLE 5-continued

| Rule # (Rule Number) | Type of access attempt | Requirements to be met | Access category |
|---|---|---|---|
| 5 | MO MMTel voice call | When the access attempt is for a MO MMTel voice call or when the access attempt is for NAS signaling connection recovery during an ongoing MO MMTel voice call (NOTE 2) | 4 (= MO MMTel voice) |
| 6 | MO MMTel video call | When the access attempt is for a MO MMTel video call Or when the access attempt is for NAS signaling connection recovery during an ongoing MO MMTel video call (NOTE 2) | 5 (= MO MMTel video) |
| 7 | MO SMS over NAS or MO SMSoIP | When the access attempt is for MO SMS over NAS or When the access attempt is for MO SMS over SMSoIP transfer or When the access attempt is for NAS signaling connection recovery during an ongoing MO SMS or SMSoIP transfer (NOTE 2) | 6 (= MO SMS and SMSoIP) |
| 8 | UE NAS initiated 5GMM specific procedures | when the access attempt is for MO signaling | 3 (= MO_sig) |
| 9 | UE NAS initiated 5GMM connection management procedure or 5GMM NAS transport procedure | when the access attempt is for MO data | 7 (= MO_data) |
| 10 | when an uplink user data packet is to be sent for a PDU session with suspended user-plane resources | No further requirement is to be met | 7 (= MO_data) |

(NOTE 1):
Herein, the 5GMM specific procedures during service is ongoing and 5GMM connection management procedures required to establish a PDU session with request types, which is "initial emergency request" or "existing emergency PDU session" or required to re-establish user-plane resources for these PDU sessions may be included. Also, this may include a service request procedure initiated by a service request message in which the service type IE is set to "emergency services fallback".
(NOTE 2):
Access for the purpose for NAS signaling connection recovery during the service in progress, or access for the purpose for establishing the NAS signaling connection after the fallback indication received from the lower layer during the service in progress may be mapped to the access category of the ongoing service, in order to derive the RRC establishment cause. However, a barring check may be skipped for this access attempt.
(NOTE 3):
When the UE selects a new PLMN, the selected PLMN may be used to check membership; Otherwise, the UE may use RPLMN or PLMN equivalent to the RPLMN.
(NOTE 4):
This may include a 5GMM connection management procedure triggered by a UE-initiated NAS transport procedure for transmitting the MO SMS.
(NOTE 5):
If the available access category for the access attempt is 1, the UE may further determine a second access category in the range of 3 to 7. If more than one access category is matched, the access category with the lowest rule number will be selected. The UE may use the second access category only to detect the RRC establishment reason for the access attempt.
(NOTE 6):
If the UE is not configured to allow overriding of the EAB, or the NAS layer of the UE does not receive an indication to override the EAB from a higher layer (eg, an application layer), and if the UE dos not have a PDU session established based on EAB, "EAB override" may not be applied.

When the access attempt matches one or more rules, an access category having the lowest rule number among the one or more rules may be selected. If the access attempt matches one or more operator-defined access category definitions, the UE may select the operator-defined access category definition with the lowest precedence value. Here, a case in which one access attempt matches one or more rules may include a case in which a plurality of events simultaneously trigger one access attempt. When the UE is in 5GMM-IDLE mode, when the NAS layer of the terminal receives a request for an access attempt from an upper layer of the terminal, the NAS layer of the terminal may classify the access attempt into an access ID and access categories according to the examples of Tables 4 and 5 described above. For access control checking, the NAS layer of the terminal may transmit a request including an available access ID and an available access category to a lower layer (eg, an RRC layer). Lower layers may perform access barring checks. The NAS layer of the terminal may provide the RRC establishment cause in the request to the lower layer. According to an implementation option, the NAS layer of the terminal may provide the RRC establishment cause to the lower layer after receiving a notification that the access attempt is allowed from the lower layer. When the lower layer informs the NAS layer that the access attempt is allowed, the NAS layer may initiate a procedure for sending an initial NAS message for the access attempt.

When the lower layer informs the NAS layer that the access attempt is barred, the NAS layer may not initiate a procedure for sending an initial NAS message for the access attempt. In addition, if the event that triggered the access attempt was MO-MMTEL-voice-call-started information/indication, MO-MMTEL-video-call-started information/indication, or MO-SMSoIP-attempt-started information/indication, the NAS layer may notify an upper layer (eg, an application layer) that the access attempt is barred. In this case, when the NAS layer receives information/indication from the lower layer (eg, the RRC layer) that the barring for the access category related to the access attempt has been relaxed, the NAS layer may inform to the upper layer that the barring for the access category has been relaxed. And, the NAS layer may initiate a procedure for transmitting the initial NAS message, if still necessary. For reference, a barring timer for each access category may be run by a lower layer. When the barring timer expires, the lower layer may notify the NAS layer of information/indication that the access barring has been relieved for each access category.

When the UE is in 5GMM-CONNECTED mode or 5GMM-CONNECTED mode with RRC deactivation indication, and when the upper layer of the terminal detects one of the events of b-1) to b-6) described above, the NAS layer of the terminal may receive a request for an access attempt from an upper layer of the terminal. Then, the NAS layer of the terminal may classify the access attempt into an access ID and an access category according to the examples of Tables 4 and 5 described above. For access control checking, the NAS layer of the terminal may transfer a request including an available access ID and an available access category to a lower layer (eg, an RRC layer). Lower layers may perform access barring checks. The NAS layer of the terminal may provide the RRC establishment cause in the request to the lower layer. According to an implementation option, the NAS layer of the terminal may provide the RRC establishment cause to the lower layer after receiving a notification that the access attempt is allowed from the lower layer.

When the UE builds a registration request (REGISTRATION REQUEST) message or a service request (SERVICE REQUEST) message for an access attempt, when the UE has uplink user data pending for one or more PDU sessions, the UE may indicate each PDU session in an uplink data state information element (IE), regardless of the access category for which the access barring check is performed. Even if the barring timer is running for some of the corresponding access categories, the UE may indicate user data waiting for each PDU session.

When the downlink layer informs the NAS layer that the access attempt is allowed, the NAS layer may perform the following actions according to the event triggering the access attempt:
  a) When the event triggering the access attempt is MO-MMTEL-voice-call-started information/indication, MO-MMTEL-video-call-started information/indication, or MO-SMSoIP-attempt-started information/indication, the NAS layer may notify an upper layer (eg, an application layer) that the access attempt is allowed;
  b) When the event triggering the access attempt is a request from an upper layer to transmit a mobile originated SMS over NAS, the NAS layer (eg, 5GMM layer) may initiate a NAS transport procedure for transmitting the SMS in a UL NAS TRANSPORT message;
  c) When the event triggering the access attempt is a request from an upper layer to establish a new PDU session, the NAS layer (eg, 5GMM layer) may initiate a NAS transport procedure to transmit a PDU session establishment request message;
  d) When the event triggering the access attempt is a request from an upper layer to modify an existing PDU session, the NAS layer (eg, 5GMM layer) may initiate a NAS transport procedure to transmit a PDU session modification request message;
  e) When the event triggering the access attempt is a request for re-establishing a user-plane resource for an existing PDU session, the NAS layer (eg, 5GMM layer) may initiate a service request procedure; and
  f) If the event triggering the access attempt is an uplink user data packet to be transmitted for a PDU session with a delayed user-plane resource, the NAS layer (eg 5GMM layer) may consider that the uplink user data packet can be transmitted.

When the downlink layer informs the NAS layer that the access attempt is barred, the NAS layer may perform the following actions according to the event triggering the access attempt:
  a) When the event triggering the access attempt is MO-MMTEL-voice-call-started information/indication, MO-MMTEL-video-call-started information/indication, or MO-SMSoIP-attempt-started information/indication, the NAS layer may notify the upper layer that the access attempt is barred. The upper layer may prohibit the initiation of the MMTEL voice session, the transmission of the MMTEL video session or SMS over IP. In this case, when the NAS layer receives information/indication from the lower layer (eg, the RRC layer) that the barring for the access category related to the access attempt has been relaxed, the NAS layer may inform the higher layer that the barring for the access category has been relaxed;
  b) When the event triggering the access attempt is a request from an upper layer to transmit a mobile originated SMS over NAS, the NAS layer (eg, 5GMM layer) may not initiate NAS transfer procedure to transmit the SMS through a UL NAS TRANSPORT message. When the NAS layer receives the information/indication from the lower layer (eg, the RRC layer) that the barring for the access category associated with the access attempt has been relaxed, the NAS layer may initiate the NAS transfer procedure if the NAS transfer procedure is still required;
  c) If the event triggering the access attempt is a request from a higher layer to establish a new PDU session, the NAS layer (eg, 5GMM layer) may not initiate a NAS transport procedure to transmit a PDU session establishment request message. When the NAS layer receives the information/indication from the lower layer (eg, the RRC layer) that the barring for the access category associated with the access attempt has been relaxed, the NAS layer may initiate the NAS transfer procedure if the NAS transfer procedure is still required;
  d) When the event triggering the access attempt is a request, which is for modifying an existing PDU session, from an upper layer, the NAS layer (eg, 5GMM layer) may not initiate a NAS transport procedure to transmit a PDU session modification request message. When the NAS layer receives the information/indication from the lower layer (eg, the RRC layer) that the barring for the access category associated with the access attempt has been relaxed, the NAS layer may initiate the NAS transfer procedure if the NAS transfer procedure is still required;
  e) When the event triggering the access attempt is a request for re-establishing a user-plane resource for an existing PDU session, the NAS layer (eg, 5GMM layer) may not initiate a service request procedure. When the NAS layer receives the information/indication from the lower layer (eg, the RRC layer) that the barring for the access category associated with the access attempt has been relaxed, the NAS layer may initiate the service request procedure if the service request procedure is still required; and f) If the event triggering the access attempt is an uplink user data packet to be transmitted for a PDU session with a delayed user-plane resource, the NAS layer (eg 5GMM layer) may not consider that the uplink user data packet may be transmitted. When the NAS layer receives information/indication from a lower layer (eg, the RRC layer) that the barring for the access category related to the access attempt has been relaxed, the NAS layer may consider that the barring for the access category has been relaxed.

For reference, when the terminal is connected to an IM (IP Multimedia) CN (Core Network) subsystem, a specific example to which the unified access control is applied is as follows. Here, the IM CN subsystem may mean a core network of the IMS.

An upper layer (eg, an application layer) of the terminal may provide information such as the following example to the NAS layer of the terminal:
MO-MMTEL-voice-started;
MO-MMTEL-voice-ended.
MO-MMTEL-video-started; and
MO-MMTEL-video-ended;

When the upper layer (eg, application layer) of the terminal receives a request to establish an originating multimedia telephony (MMTEL) communication session from the user, the upper layer (eg, application layer) of the terminal of the terminal may performs operations as in the following example:

1) If the MMTEL communication session to be established is an emergency session, the following steps may be skipped and the procedure for establishing the MMTEL communication set may be performed;

2) If audio or real-time text or both audio and real-time text are provided in the MMTEL communication session, and there is no other outgoing MMTEL communication session providing audio, or real-time text or audio and real-time text, the application layer of a terminal (eg, UE) may transmit the MO-MMTEL-voice-started indication/information to the NAS layer. and:

2-a) If the barring result is "not-barred", the upper layer (eg, application layer) of the terminal may continue the session establishment procedure for establishing the MMTEL communication session. For reference, the barring result may be a barring result for the MO-MMTEL-voice-started indication/information delivered from the NAS layer.

2-b) when the barring result is "barred", the upper layer (eg, the application layer) of the terminal rejects the MMTEL communication session establishment, and may skip the following steps; and 3) When video is provided in the MMTEL communication session and there is no other outgoing MMTEL communication session providing video, the application layer of the UE may transmit the MO-MMTEL-video-started indication/information to the NAS layer. and:

3-a) If the barring result is "not-barred", the upper layer (eg, the application layer) of the terminal may continue the session establishment procedure for establishing the MMTEL communication session.

3-b) If the barring result is "barred", the upper layer (eg, the application layer) of the terminal rejects the establishment of the MMTEL communication session, and may skip the following steps.

For reference, while communication based on the MMTEL communication session is being performed, adding or removing media may not be subject to unified access control.

When an outgoing MMTEL communication session (an outgoing MMTEL communication session that was initiated providing audio or real-time text or both audio and real-time text) is terminated (e.g., due to a response to a BYE message or a failed response to an initial INVITE request message), and if there is no other outgoing MMTEL communication session providing audio or real-time text or audio and real-time text, the application layer of the terminal (eg, UE) transmits the MO-MMTEL-voice-ended indication/information to the NAS layer. can When the outgoing MMTEL communication session (the outgoing MMTEL communication session that was initiated providing video) is terminated (eg, the response to the BYE message is due to a failure response to the initial INVITE request message), and if another outgoing MMTEL communication session providing video (e.g. in the SDP (Session Description Protocol) offer included in INVITE request message) does not exist, the application layer of the terminal (eg, UE) may transmit the MO-MMTEL-video-ended indication/information to the NAS layer.

Under the above IMS, an IP-based session may be controlled by a session initiation protocol (SIP). SIP is a protocol for controlling a session. SIP is a protocol for controlling session, SIP is signaling protocol specifying a procedure for terminals wanting to communicate to identify each other and find their location, create a multimedia service session between them, or delete and change the created session. This SIP uses a SIP Uniform Resource Identifier (URI) similar to an e-mail address to identify each user, so that a service can be provided without being dependent on an IP (Internet Protocol) address. These SIP messages are control messages, but are transmitted between the UE and the IMS network through the user plane of the 5G core network.

II. Problems to be Solved by the Disclosure of the Present Specification

In order for a terminal using the 3GPP system to receive IMS services such as voice call, video call, and SMS (eg, SMS over IP), the terminal must be registered with the IMS network. In addition, the terminal needs to periodically re-register with the IMS network.

Signaling between such UE and the IMS may be performed through SIP signaling (or IMS signaling) between the IMS layer of the UE and the core IMS. Here, the IMS layer of the terminal may be a layer included in the application layer of the terminal. Here, the IMS layer of the terminal may be an upper layer with reference to the NAS layer of the terminal. The application layer of the terminal may also be a higher layer with reference to the NAS layer of the terminal. Depending on the implementation of the terminal, the IMS layer of the terminal and the application layer of the terminal may be implemented separately from each other. Alternatively, the IMS layer of the terminal may be included in the application layer of the terminal. For reference, an operation performed by the IMS layer of the terminal may also be performed by the application layer of the terminal. IMS signaling may mean signaling between the IMS layer of the terminal and the IMS.

This IMS signaling is performed through user plane of IMS APN (Access Point Name)/DNN (Data Network Name) based PDU session (when the terminal performs communication based on 5GS (5G System)) or user plane of PDN (Packet Data) Network) connection (when the terminal performs communication based on EPS).

When an attempt related to the IMS service occurs, the IMS layer of the terminal may transmit information or an indication related to the attempt related to the IMS service to the NAS layer of the terminal. Here, an attempt related to an IMS service may mean an attempt related to an IMS service such as multimedia telephony (MMTEL) voice, MMTEL video, and SMS, etc. The NAS layer of the terminal may determine an access category of the attempt related to the IMS service based on the information or indication received from the IMS layer of the terminal. For example, an access category related to an IMS service may be 4 (eg, an access category related to Mobile Originated (MO) MMTel voice), 5 (eg, an access category related to MO MMTel video), 6 (eg, access category related to MO SMS or SMSoIP). The NAS layer of the terminal may determine the access category according to the information or indication transmitted by the IMS layer of the terminal.

The NAS layer of the terminal may deliver the information or the indication delivered by the IMS layer of the terminal and information on the determined access category to the RRC layer of the terminal. The RRC layer of the terminal may perform access control check (eg: barring check) based on the information on the access category delivered by the NAS layer of the terminal, the SIB (system information block) information broadcast by the base station, and the access control information (eg, unified access control information). The RRC layer of the terminal may deliver information on whether to barring the access category delivered by the NAS layer to a higher layer (eg, NAS layer).

When the RRC layer of the terminal delivers the information that the access category is barred to the NAS layer of the terminal, the NAS layer of the terminal may deliver information that the access category is barred to the IMS layer.

It may be necessary for the IMS layer of the terminal may transfer IMS signaling (e.g., IMS signaling according to a purpose of initial registration, re-registration, subscription refresh, etc.) rather than an actual attempt related to IMS service (e.g., IMS signaling according to a purpose of related to IMS services such as multimedia telephony (MMTEL) voice, MMTEL video, and SMS).

Hereinafter, IMS signaling that is not an actual attempt related to an IMS service will be referred to as IMS signaling for a non-service attempt. In this case, the IMS layer of the terminal may transfer information (eg, MO data information) that user data for a general IMS-related PDU session or IMS-related PDN connection has occurred, to the NAS layer of the terminal. generally without interaction between a separate IMS layer and a NAS layer Accordingly, the terminal may transmit the information that user data has occurred through the user plane to the IMS through the user plane (when the terminal is connected to the IMS) or the terminal may perform a transition procedure to connected state (when the terminal is in the idle state for the IMS or connected with inactive indication).

The NAS layer of the terminal uses category 7 (MO data) for IMS signaling transmission for a non-service attempt. The NAS layer of the terminal may deliver access category information (category 7) to the RRC layer of the terminal. If access control is being applied to the network and/or terminal due to network congestion, etc., the category for this general data transmission (eg, category 7 (MO data)) is likely to have a lower priority compared to other access category (eg, category 4 to 6, etc. IMS Since a service-related category), thus it is highly likely to be barred (blocked) by the RRC layer. For example, when access control is applied to a network and/or a terminal, a policy for priority among a plurality of access categories may be set (or may be pre-configured). When a situation in which access needs to be restricted such as network congestion occurs, a network node (eg, AMF) sets barring information for each access category based on this policy and notifies the barring information to the terminals. According to such a policy, the probability of being barred for each access category may be different, and it is highly likely that the access category with a lower priority will be barred first.

Figure 7:
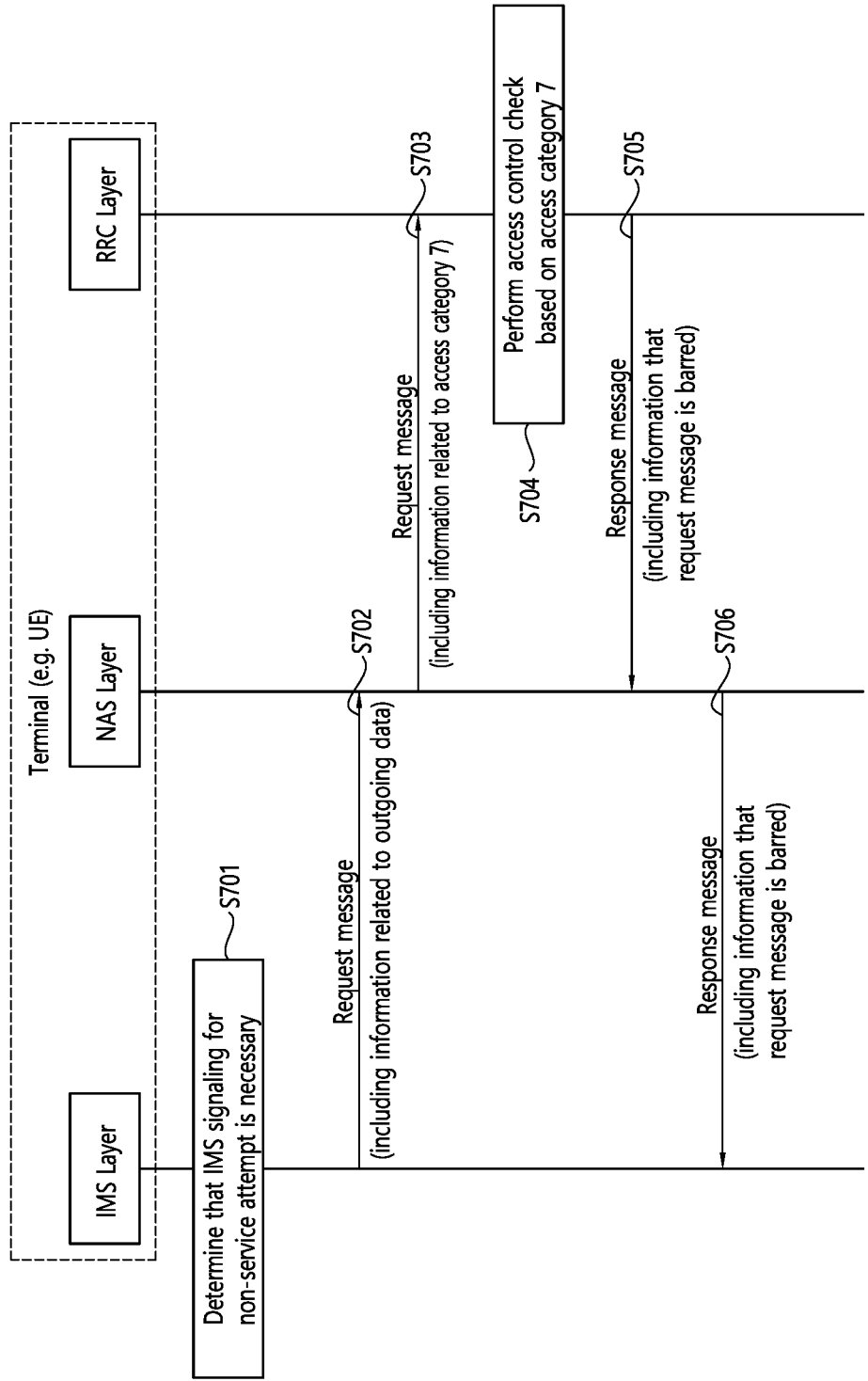
FIG. 7 shows an example of a problem to be solved by the disclosure of the present specification.

FIG. 7 is a signal flow diagram for explaining an example of a problem to be solved by the disclosure of the present specification. The following drawings were created to explain an example of the problem to be solved by the disclosure of the present specification. Since the names of specific devices described in the drawings or the names of specific signals/messages/fields are presented by way of example, the technical features of the present specification are not limited to the specific names used in the following drawings.

FIG. 7 shows an example of a problem to be solved by the disclosure of the present specification.

Referring to FIG. 7, a terminal (eg, UE) may include an IMS layer, a NAS layer, and an RRC layer.

In step S701, the IMS layer may determine that IMS signaling for a non-service attempt is necessary. For example, IMS signaling for a non-service attempt may be IMS signaling for purposes such as initial registration, re-registration, and subscription refresh.

In step S702, the IMS layer may transmit a request message including information related to outgoing data to the NAS layer. The information related to the outgoing data may indicate information that user data has occurred. Information related to outgoing data may include information called MO data (corresponding to access category 7).

In step S703, since the NAS layer has received information related to outgoing data (eg, MO data information) from the IMS layer, the NAS layer may use access category 7 for IMS signaling for non-service attempts. The NAS layer may transmit a request message (including information on access category 7) to the RRC layer.

In step S704, the RRC layer may be in a state in which access control is being applied due to network congestion or the like. Since the RRC layer has received the information on the access category 7 from the NAS layer, the RRC layer may perform an access control check based on the access category 7. Because the category for such general data transmission (eg, access category 7 (MO data)) has a lower priority than other access categories (eg, categories related to IMS services such as access categories 4 to 6), the category for such general data transmission (eg, access category 7 (MO data)) is likely to be barred by the RRC layer. For example, when access control is applied to the RRC layer, priorities for a plurality of access categories may be configured (or may be pre-configured), when access control is applied to a specific access category (eg, category 5), the network and/or the terminal may bar access related to a specific access category and an access category 7 having a lower priority than the specific access category.

In step S705, the RRC layer may transmit a response message to the NAS layer. The response message may include information indicating that the request message transmitted by the NAS layer in step S703 is blocked (barred).

In step S706, the NAS layer may transmit a response message to the IMS layer. The response message may include information indicating that the request message transmitted by the IMS layer in step S702 is barred.

As described above, if the IMS signaling for the non-service attempt is barred, the access attempt related to the IMS signaling for the non-service attempt may fail. Since an access attempt such as re-registration for the IMS has failed, it may be impossible for the terminal to use the IMS-related service.

Specifically, compared with other data services, conventionally, differentiated access control (eg, congestion control) may be performed for IMS services such as voice, video, and SMS.

However, since differentiated congestion control is not supported for IMS signaling (eg, IMS registration message such as SIP REGISTER) for a non-service attempt that must be preceded in order for the terminal to receive such an IMS service, there may be a problem in that the terminal is not provided with the IMS service since the terminal cannot register with the IMS. In particular, in this case, there may be a problem that the terminal cannot use a service that is very important to the user, such as a voice call.

For reference, in the present specification, the SIP signal may be used interchangeably with the IMS signal.

III. Disclosure of the Present Specification

The disclosures described below in this specification may be implemented in one or more combinations. Each of the drawings shows an embodiment of each disclosure, but the embodiments of the drawings may be implemented in combination with each other.

Various methods of the disclosure of the present specification to be described below (eg, the methods described in the first example, the second example) may be implemented in combination of one or more.

There may be a need for the IMS layer of the terminal to transmit SIP (Session Initiation Protocol) signaling (or IMS signaling) (that is, the IMS layer of the terminal may need to transmit SIP signaling (or IMS signaling)). Here, the SIP signaling (or IMS signaling) is a signaling (ie, SIP signaling rather than an actual attempt related to the IMS service) other than a call attempt related to MMTEL voice (eg SIP INVITE), a call attempt related to MMTEL video (eg SIP INVITE), or SMS over IP (eg SIP MESSAGE), the UE may operate as described below. For reference, hereinafter, SIP signaling (or IMS signaling) and IMS signaling may be used as the same meaning.

Hereinafter, SIP signaling (or IMS signaling) for an IMS service such as a call attempt related to MMTEL voice (eg SIP INVITE), a call attempt related to MMTEL video (eg SIP INVITE), or SMS over IP (eg SIP MESSAGE)) will be referred to as SIP signaling (or IMS signaling) for service attempt. For SIP signaling (or IMS signaling) for service attempt, an access category related to the corresponding SIP signaling (or IMS signaling) may be defined. For example, an access category of signaling related to MO MMTEL voice may be 4, an access category of signaling related to MO MMTel video may be 5, and an access category of signaling related to MO SMS or MO SMSoIP may be 6.

Here, SIP signaling (or IMS signaling) that is not an actual attempt related to the IMS service may be, for example, SIP REGISTER for initial registration or re-registration, or SIP SUBSCRIBE for subscription refresh, etc. Hereinafter, SIP signaling (or IMS signaling) that is not an actual attempt related to an IMS service will be referred to as SIP signaling (or IMS signaling) for a non-service attempt. That is, the SIP signaling (or IMS signaling) for the non-service attempt may be SIP signaling (or IMS signaling) other than the SIP signaling (or IMS signaling) for the service attempt. Hereinafter, SIP signaling and IMS signaling may be used interchangeably.

When "SIP signaling (or IMS signaling) for non-service attempt" occurs (eg, when IP REGISTER for re-registration occurs), the IMS layer of the terminal may provide information or indication (hereinafter referred to as information/indication) related to "SIP signaling (or IMS signaling) for non-service attempt" to the NAS layer of the terminal. Information or indication related to "SIP signaling (or IMS signaling) for non-service attempt" may be, for example, information/indication that "SIP signaling (or IMS signaling) for non-service attempt" has occurred. In this case, the IMS layer of the terminal may additionally provide information or indication related to one of a plurality of access categories (eg, access category 4 (MO MMTel voice), access category 5 (MO MMTel video), or access category 6 (MO SMS and MO SMSoIP)) related to the IMS service attempt.

For example, the IMS layer of the terminal may provide information/indication related to "SIP signaling (or IMS signaling) for non-service attempt" and "MO-MMTEL-voice-started" information/indication related to access category 4 (MO MMTel voice) to the NAS layer of the terminal. Then, based on information/indication related to "SIP signaling (or IMS signaling) for non-service attempt", the NAS layer of the terminal may recognize that that the purpose of the signaling transmitted by the IMS layer of the terminal is SIP signaling (or IMS signaling) for non-service attempt.

Specifically, the IMS layer of the terminal may transmit request message including information/indication related to "SIP signaling (or IMS signaling) for non-service attempt" and "MO-MMTEL-voice-started" information/indication related to access category 4 (MO MMTel voice) to the NAS layer of the terminal.

The NAS layer of the terminal may determine the access category of the request message as access category 4 corresponding to MO MMTel voice based on "MO-MMTEL-voice-started" information/indication. The NAS layer of the terminal may transmit information that the access category of the request message is access category 4 to the RRC layer. Then, the RRC layer of the terminal may perform a barring check for the request message based on the access category 4. In this case, if an MMTEL voice attempt request having a high priority (eg, when access category 4 has a higher priority than access category 7) is passed, the IMS layer of the terminal may successfully transmit IMS signaling through a PDU session or PDN connection.

For example, access control for access category 7 is being applied to the network and/or terminal due to network congestion, etc, and access control is not applied to access category 4, which has a higher service priority than access category 7. request message including information/indication related to "SIP signaling (or IMS signaling) for non-service attempt" and "MO-MMTEL-voice-started" information/indication related to access category 4 (MO MMTel voice) may pass the barring check. The RRC layer of the terminal may transmit information that the barring check has passed to the IMS layer of the terminal through the NAS layer of the terminal. Then, the terminal may transmit the request message to a network (eg, an IMS-related network) through a PDU session (eg, IMS PDU session) or a PDN connection (eg, IMS PDN connection). That is, when the IMS layer of the terminal transmits a request message including information/indication related to access category 7 to the NAS layer, the request message is barred by an access control check (eg, barring check), but when the IMS layer of the terminal transmits information/indication related to an access category (eg, access category 4) having a higher priority than access category 7, the request message may pass a barring check of the RRC layer.

In other words, the IMS layer of the terminal may transmit a request message including information/indication related to one of information/indication related to "SIP signaling (or IMS signaling) for non-service attempts" and a plurality of access categories (eg, access category 4 (MO MMTel voice), access category 5 (MO MMTel video) or access category 6 (MO SMS and MO SMSoIP)) related to IMS service attempts to the NAS layer. In this way, the UE may perform a preliminary operation (eg, initial registration, re-registration, subscription refresh, etc.) for an IMS service attempt.

For example, the IMS layer of the terminal transmits the request message, so that re-registration is successful, so that the terminal (eg, UE) in the IMS network can maintain the registration state in the registered IMS network. Since the terminal maintains the registration state in the IMS network, when an IMS service attempt such as a voice call is required thereafter, the terminal may perform IMS signaling for the IMS service attempt.

In the example described above, an example that the IMS layer of the terminal may transmit a request message including information/indication related to SIP signaling (or IMS signaling) for non-service attempt and "MO-MMTEL-voice-started" information/indication related to access category 4 (MO MMTel voice) to the NAS layer of the terminal has been described. However, this is only an example, and in order for the NAS layer of the terminal to receive an access category different from the access category 7 for "SIP signaling (or IMS signaling) for non-service attempt", the IMS layer of the terminal may use newly defined information/indications. For example, the newly defined information/indication may be "MO-MMTEL-voice related SIP signaling". Therefore, in the disclosure of the present specification, the range of information/indication transmitted by the IMS layer of the terminal for "SIP signaling (or IMS signaling) for non-service attempt" includes all forms of information/indication applicable in order for the NAS layer of the terminal to receive an access category, which is different from access category 7, for "SIP signaling (or IMS signaling) for non-service attempt".

As in the above example, in a situation that the IMS layer of the terminal transmits a request message including information/indication related to "SIP signaling (or IMS signaling) for non-service attempt" and "MO-MMTEL-voice-started" information/indication related to access category 4 (MO MMTel voice) to the NAS layer of the terminal, there may be a case in which access to access category 4 (MMTel voice) is barred. For example, when the base station (ng-eNB or gNB) notifies the terminal of barring for access category 4 through the SIB, the terminal (eg, the RRC layer of the terminal) blocks (bars) access category 4, thus an access attempt to transmit "SIP signaling (or IMS signaling) for non-service attempts" may be rejected. For example, the request message may be rejected by the RRC layer of the terminal.

In this way, although the IMS layer of the terminal transmits request message including information/indication related to "SIP signaling (or IMS signaling) for non-service attempts" and information/indication related to one of a plurality of access categories related to IMS service attempts, when the request message is rejected or barred, the example of the disclosure of the present specification described below may be applied.

An example of the operation of the terminal and the network according to the disclosure of the present specification described above will be described with reference to FIGS. 8 and 9.

The following drawings were created to explain a specific example of the present specification. The names of specific devices described in the drawings or the names of specific signals/messages/fields are presented by way of example, so that the technical features of the present specification are not limited to the specific names used in the following drawings.

Figure 8:
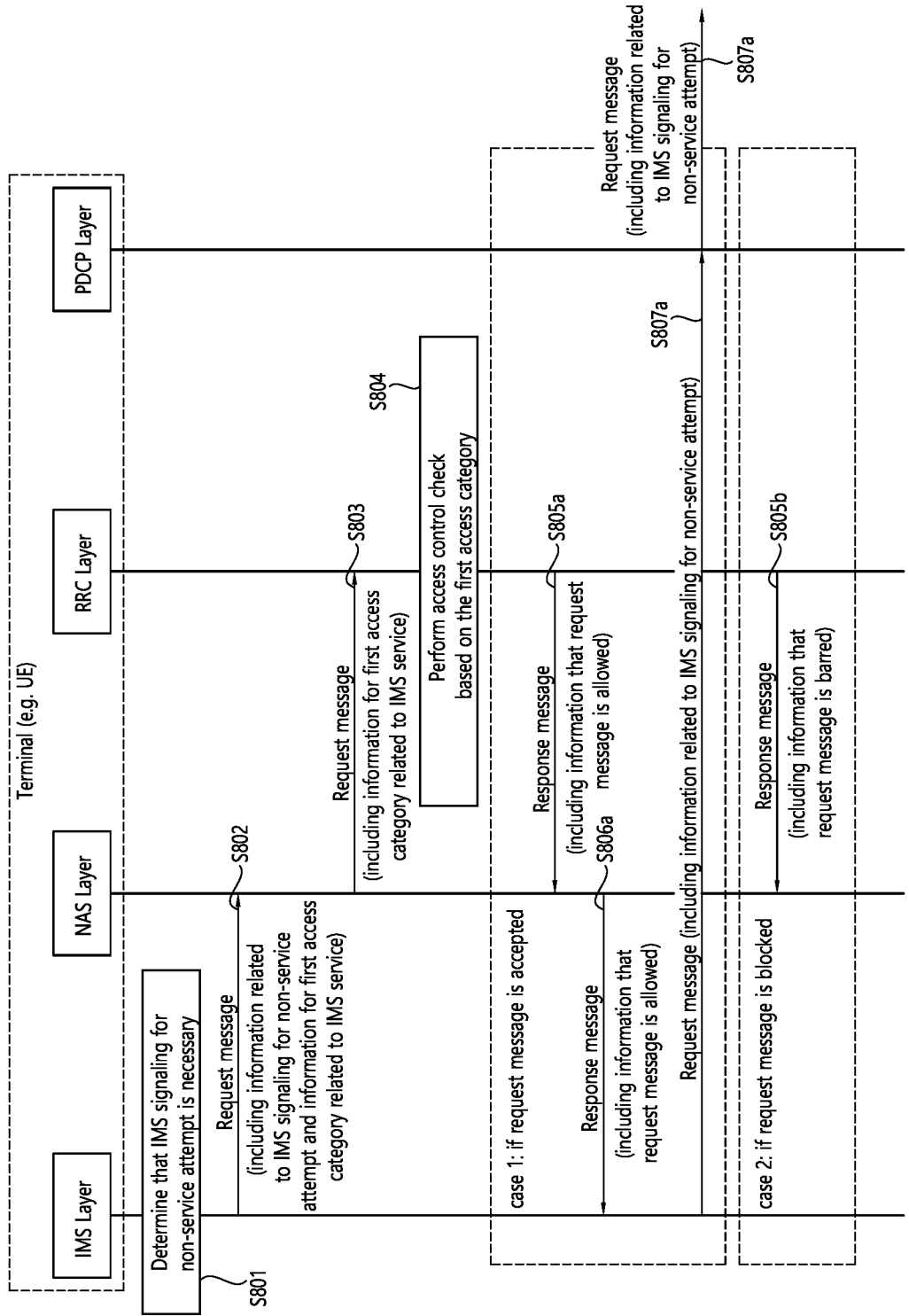
FIG. 8 is an exemplary signal flow diagram illustrating the disclosure of the present specification.

FIG. 8 is an exemplary signal flow diagram illustrating the disclosure of the present specification.

Referring to FIG. 8, a terminal (eg, UE) may include an IMS layer, a NAS layer, and an RRC layer.

In step S801, the IMS layer may determine that IMS signaling for a non-service attempt is necessary. For example, IMS signaling for a non-service attempt may be IMS signaling for purposes such as initial registration, re-registration, and subscription refresh.

In step S802, the IMS layer may transmit a request message to the NAS layer. Here, the request message includes information/indication related to "SIP signaling (or IMS signaling) for non-service attempt" and information/indication related to one of plurality of access categories related to IMS service (eg, access category 4 (MO MMTel voice), access category 5 (MO MMTel video), or access category 6 (MO SMS and MO SMSoIP)). One of the plurality of access categories related to the IMS service attempt may be a first access category (eg, access category 4). For example, the information on the first access category (eg, access category 4) in step S802 may be "MO-MMTEL-voice-started" information/indication.

The NAS layer may recognize the purpose of the IMS layer transmitting the request message is "SIP signaling (or IMS signaling) for non-service attempts", based on information/indication related to "SIP signaling (or IMS signaling) for non-service attempts.

In step S803, since the NAS layer has received information on the first access category from the IMS layer, the NAS layer may use the first access category for IMS signaling for non-service attempts. The NAS layer may transmit a request message (including information on the first access category (eg, access category 4)) to the RRC layer.

The NAS layer may include information for requesting barring information for a plurality of access categories related to IMS service attempts in the request message. That is, the request message transmitted in step S803 may include information for requesting information on the first access category and barring information on a plurality of access categories. Here, the barring information for the plurality of access categories may be information about which access category is barred and which access category is allowed among the access categories 4 to 6 related to the IMS service attempt in the RRC layer. Alternatively, the NAS layer may request barring information for the plurality of access categories received by the RRC layer through broadcast, that is, a barring time and a barring factor, etc. Then, the RRC layer, based on the information requesting barring information for a plurality of access categories related to the IMS service attempt, may transmits barring information for a plurality of access categories to the NAS layer in steps S805a and/or S805b.

Alternatively, the NAS layer may include information related to IMS signaling for a non-service attempt in the request message. That is, the request message transmitted in step S803 may include information about the first access category and information related to IMS signaling for a non-service attempt. Then, the RRC layer may transmit barring information for a plurality of access categories to the NAS layer in steps S805a and/or S805b based on information related to IMS signaling for non-service attempts.

In step S804, the RRC layer may be in a state in which access control is being applied due to network congestion or the like. Since the RRC layer has received information on the first access category (eg, access category 4) from the NAS layer, the RRC layer may perform an access control check based on the first access category (eg, access category 4).

When no access control is applied for the first access category (eg, access category 4) (eg, when the priority of an access category barred according to access control is lower than access category 4), the RRC layer may accept request message received from the NAS layer. The RRC layer may transmit information that the request message is allowed (eg, "not barred" information) to the NAS layer. When the request message is accepted, the operation related to case 1 may be performed.

When access control is applied for the first access category (eg, access category 4) (eg, when the priority of an access category barred according to access control is higher than access category 4), the RRC layer may bar (block) request message received from the NAS layer. The RRC layer may transmit information that the request message is blocked (barred) (eg, "barred" information) to the NAS layer. When the request message is barred, an operation related to case 2 may be performed.

For reference, when the request message of step S803 includes information requesting barring information or information related to IMS signaling for a non-service attempt, the RRC layer may transmit barring information for a plurality of access categories related to the IMS service attempt to the NAS layer in step S805a and/or step S805b. For example, the RRC layer may transmit barring information of access category 4 to access category 6 to the NAS layer, based on the previously performed access control check. For example, the barring information for the plurality of access categories may include information on whether to block (bar) each of the plurality of access categories (eg, access category 4: barred, access category 5: allowed, access category 6: allowed). As another example, the barring information on the plurality of access categories may include information on the barred access category (eg, access category 5) among the plurality of access categories. As another example, the barring information for the plurality of access categories may include information on allowed access categories (eg, access category 4 and access category 5). As another example, the barring information for a plurality of access categories may include barring information for each access category, that is, barring time and barring probability (barring factor) information for each access category.

According to the result (accepted or barred) of the access control check performed by the RRC layer, if the request message is accepted, the operation related to case 1 of FIG. 8 may be performed, and if the request message is barred, case 2 of FIG. 8 An operation related to may be performed.

For example, when the request message is accepted, the operation related to case 1 may be performed.

In step S805a, the RRC layer may deliver that the access request due to the request message (including information related to IMS signaling for a non-service attempt) is allowed to a higher layer (eg, NAS layer). For example, the RRC layer may transmit a response message including information indicating that the request message is accepted (eg, information indicating that an access request due to the request message is allowed) to the NAS layer. The response message may further include barring information for a plurality of access categories related to the IMS service attempt.

The NAS layer may preferentially perform related NAS operations if necessary. For example, when the terminal is in the IDLE state, the NAS layer may preferentially perform a service request procedure to transmit IMS signaling for a non-service attempt. Finally, if access is granted, for example, when the PDU session related to IMS signaling for non-service attempts is successfully activated by transitioning to the CONNECTED state, in step S806a, the NAS layer may transmit a response message including information that the request message is accepted to the IMS layer.

In step S807a, the IMS layer of the terminal may transmit a request message including information related to IMS signaling for a non-service attempt to the IMS network through a Packet Data Convergence Protocol (PDCP) layer of the terminal. For example, the IMS layer of the terminal may transmit a request message including information related to IMS signaling for a non-service attempt to the PDCP layer, based on the response message received in step S806a. Then, the PDCP layer may transmit the request message to the IMS network through the RAN and the UPF, through the PDU session for IMS.

As the IMS layer of the terminal transmits request message including information/indication related to "SIP signaling (or IMS signaling) for non-service attempt" and information/indication related to one of a plurality of access categories related to IMS service attempt to the NAS layer (eg, S802 in FIG. 8), the terminal may perform a preliminary operation for an IMS service attempt (eg, initial registration, re-registration, subscription refresh, etc.). A specific example in which the request message of step S807a is transmitted to the network will be described with reference to FIG. 9.

For example, when the request message is barred, an operation related to case 2 may be performed.

In step S805b, the RRC layer may transmit a response message (including information that the request message is barred) to the NAS layer. The response message may further include barring information for a plurality of access categories related to the IMS service attempt.

For reference, after step S805b of case 2, an operation according to an example of the disclosure of the present specification to be described later may be performed.

Hereinafter, a specific example in which the request message of step S805a is transmitted to the network will be described with reference to FIG. 9.

The following drawings were created to explain a specific example of the present specification. The names of specific devices described in the drawings or the names of specific signals/messages/fields are presented by way of example, so that the technical features of the present specification are not limited to the specific names used in the following drawings.

Figure 9:
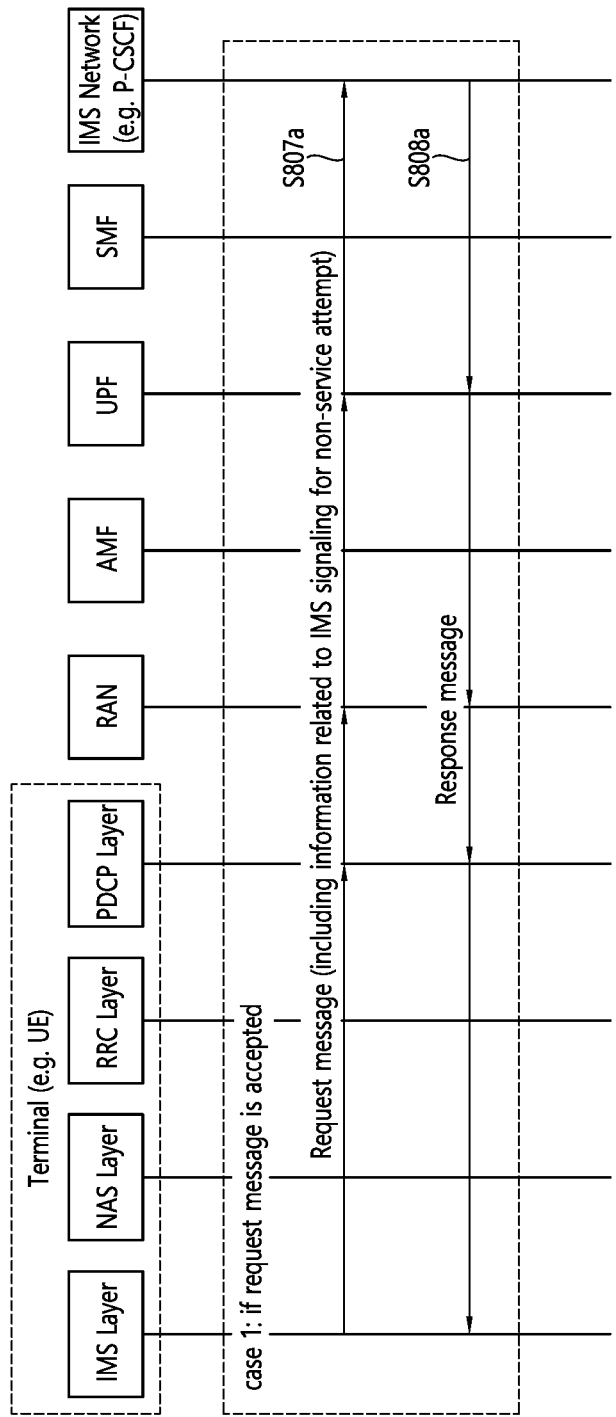
FIG. 9 is an exemplary signal flow diagram illustrating operations according to case 1 of FIG. 8.

FIG. 9 is an exemplary signal flow diagram illustrating operations according to case 1 of FIG. 8.

In step S807a, the IMS layer transmits IMS signaling for a non-service attempt through the user plane of the corresponding PDU session (eg, a PDU session between the IMS layer of the terminal and the IMS network). For example, the IMS layer may transmit a request message (including information related to IMS signaling for a non-service attempt) to the PDCP layer. Then, the PDCP layer may transmit a request message (including information related to IMS signaling for a non-service attempt) to an IMS network (eg, a proxy call session control function (P-CSCF)) through the RAN and UPF.

As the IMS network (eg P-CSCF) receives the request message (including information related to IMS signaling for non-service attempts), the terminal and the IMS network may perform procedures for initial registration, re-registration, or subscription refresh.

In step S808a, the IMS network (eg, P-CSCF) may transmit a response message, in response to the request message, (eg, initial registration acceptance, re-registration acceptance, subscription refresh acceptance, etc.) to the IMS layer of the terminal. This response message is transmitted to the PDCP layer of the UE through the user plane of the UE via UPF and RAN, and the PDCP layer may transmit the response message to the IMS layer. For example, as the IMS layer of the terminal transmits a request message for re-registration, thus re-registration succeeded, the terminal (eg, UE) in the IMS network may maintain the registration state in the registered IMS network. Since the terminal maintains the registration state in the IMS network, when an IMS service attempt such as a voice call is required thereafter, the terminal may perform IMS signaling for the IMS service attempt.

As in case 2 of FIG. 8, although the IMS layer of the terminal transmits a request message including information/indication related to "SIP signaling (or IMS signaling) for non-service attempts" and information/indication related to one of a plurality of access categories related to IMS service attempts to the NAS layer, if the request message is rejected or blocked (barred) by the RRC layer, an example of the disclosure of the present specification described below may be applied.

1. Examples of the Disclosure of the Present Specification

When "SIP signaling (or IMS signaling) for non-service attempt" occurs, the IMS layer of the terminal may transmit request message including information/indication related to "SIP signaling (or IMS signaling) for non-service attempt" and information/indication related to one (eg, the first access category) of a plurality of the access categories related to IMS service attempts, to the NAS layer. The NAS layer of the terminal may transmit a request message including information/indication related to the first access category to the RRC layer. When the request message is rejected or barred by the RRC layer, the NAS layer of the terminal may receive a response message including information that the request message is rejected or barred from the RRC layer of the terminal. In this case, The NAS layer of the terminal transmits a request message including information/indication related to an access category different from the first access category (eg, a second access category) among a plurality of access categories related to the IMS service attempt to the NAS layer of the terminal.

For example, when IMS signaling (eg, "SIP signaling (or IMS signaling) for non-service attempt" or "SIP signaling (or IMS signaling) for service attempt") occurs in the IMS layer, the IMS layer may transmit information/indication related to the first access category (eg, MO-MMTEL-voice started information/indication) to the NAS layer. The NAS layer may transmit an access request including information on the first access category (eg, access category 4 (MMTEL voice)) to a lower layer (eg, an RRC layer), based on the information/indication (eg, MO-MMTEL-voice started information/indication) related to the first access category. When the access request is barred (blocked), the NAS layer may re-attempts access attempt based on other types (e.g. access category 5 (MMTEL video), access category 6 (SMS) related to IMS service (eg, MMTEL related IMS service or SMS related IMS service).

That is, an upper layer (eg, IMS layer) requested an access attempt based on information/indication related to the first access category (eg, MO-MMTEL-voice-started information/indication related to access category 4), but the first access category (e.g. access category 4) has been barred by a lower layer (e.g. RRC layer). Therefore, the NAS layer may attempt a access request based on a second access category (e.g. access category 5 (MMTEL video) or access category 6 (MO SMS and MO SMSoIP)), which is not the first access category (e.g. access category 4). That is, the NAS layer may retry an access request by transmitting a request message including information on the second access category to the RRC layer.

However, in order to distinguish an access attempt for a general actual access attempt ("SIP signaling (or IMS signaling) for a service attempt") and "SIP signaling (or IMS signaling) for a non-service attempt", the IMS layer may separately deliver an event indication or a separate indication to the NAS layer. As an example, when "SIP signaling (or IMS signaling) for a non-service attempt" occurs, the IMS layer may include an event indication or a separate indication separately in the request message of step S802 of FIG. For reference, a separate event indication or a separate indication may be information/indication related to "SIP signaling (or IMS signaling) for a non-service attempt" described above.

When information/indication related to "SIP signaling for non-service attempt (or IMS signaling)" is provided, the NAS layer may recognize that the purpose of the IMS layer transmitting the request message is "SIP signaling for non-service attempt (or IMS)" signaling)". The NAS layer may perform a retry using a different access category only for an access attempt for this signaling purpose (purpose of "SIP signaling (or IMS signaling) for non-service attempt").

Access attempts for other case (ie, for the purpose of "SIP signaling (or IMS signaling) for service attempt"), the NAS layer may not perform retry using another access category. That is, in this case, the NAS layer may transmit a response message (including information indicating that the request message is barred) to the IMS layer as in step S706 of FIG. 7, as in the conventional operation. Here, the information that the request message (access attempt) is barred may indicate whether an access attempt related to "SIP signaling (or IMS signaling) for service attempt" is barred.

In a situation where the NAS layer receives information/indication related to "SIP signaling (or IMS signaling) for non-service attempts", the access attempt is barred for the first access category (eg, access category 4) and an access attempt for the second access category (eg, access category 5) may be allowed (allowed or not barred). In this case, the NAS layer may perform a retry based on the second access category (eg, access category 5) to successfully transmit the IMS signaling through the IMS-related PDU session or the IMS-related PDN connection of the terminal.

Specifically, the NAS layer may transmit a request message including information on the second access category (eg, access category 5) to the RRC layer. Then, the RRC layer may deliver a response message including information that the request message is accepted to the NAS layer. The NAS layer may deliver a response message including information indicating that the request message has been accepted to the IMS layer. Then, the IMS layer transmits a request message including information related to "SIP signaling (or IMS signaling) for a non-service attempt" to the PDCP layer (refer to step S807a of FIGS. 8 and 9)", IMS signaling transmission through the IMS related PDU session of the terminal or IMS related PDN connection of the terminal may be successful.

If the retries based on the second access category (e.g. access category 5) fail, i.e. if the second access category (e.g. access category 5) is also barred, the NAS layer may optionally try requests again. That is, after the NAS layer transmits a request message including information on the second access category (eg, access category 5) to the RRC layer, and when the NAS layer receives a response message including information that the request message is barred from the RRC layer, the NAS layer may optionally try the request again.

In this case, the NAS layer may request an access control check (eg, barring check) to a lower layer (eg, the RRC layer), by allocating a third access category (eg, access category 6) of the plurality of access categories related to the IMS attempt, which is different from the first access category (eg, access category 4) and the second access category (eg, access category 5). Access category 6 may be an access category corresponding to the SMSoIP request. A first access category (eg, access category 4) and a second access category (eg, access category 5) may be barred, and a third access category (eg, access category 6) may be allowed. In this case, the NAS layer may perform a retry based on the third access category (eg, access category 6) to successfully transmit the IMS signaling through the IMS-related PDU session or IMS-related PDN connection of the UE. Specifically, the NAS layer may transmit a request message including information on a third access category (eg, access category 6) to the RRC layer. Then, the RRC layer may deliver a response message including information that the request message is accepted to the NAS layer. The NAS layer may transmit a response message including information indicating that the request message has been accepted to the IMS layer. Then, the IMS layer may transmits a request message including information related to "SIP signaling (or IMS signaling) for non-service attempt" to the PDCP layer (refer to step S807a in FIGS. 8 and 9), the IMS layer enables the terminal's IMS signaling transmission through an IMS-related PDU session or IMS-related PDN connection to be performed successfully.

As described above, if the signaling transmission request using the first access category fails, the NAS layer may retry the signaling transmission request using the second access category. If the signaling transmission request using the second access category fails, the NAS layer may retry the signaling transmission request using the third access category. For example, the NAS layer may sequentially perform signaling transmission request retry using access category 5 and signaling transmission request retry using access category 6 after failure of the signaling transmission request using access category 4.

In the example above, the first access category is access category 4, the second access category is access category 5, and the third access category is access category 6. The NAS layer may determine the first access category, the second access category, and the third access category based on a preset (or stored) order. The order in which the access categories are used (eg, access category 4-access category 5-access category 6) may be changed according to the implementation of the terminal or the operator's policy. These settings may be provided to the terminal by the network (eg, AMF node). In addition, these settings may be changed according to the operator policy.

For example, an access category used for retransmission of "SIP signaling (or IMS signaling) for non-service attempt" may be set in the terminal. For example, a setting for designating an access category used for retransmission of "SIP signaling (or IMS signaling) for non-service attempt" as access category 5 may be stored in the terminal. These settings may be equally applied to each PLMN or may be equally applied to all PLMNs. These settings may be provided to the terminal by the network (eg, AMF node). In addition, these settings may be changed according to the operator policy.

For example, the order of the access categories used for retransmission of "SIP signaling (or IMS signaling) for non-service attempt" may be set in the terminal. For example, a setting to attempt retransmission of "SIP signaling (or IMS signaling) for non-service attempt" in the order of access category 5-access category 4-access category 6 may be stored in the terminal. These settings may be equally applied to each public land mobile network (PLMN) or may be equally applied to all PLMNs. These settings may be provided to the terminal by the network (eg, AMF node). In addition, these settings may be changed according to the operator policy.

As in the above example, the NAS layer may perform retry in the order of AC (Access Category: Access Category) 4-AC 5-AC 6. Or, the order in which the three types of access categories are used, such as an order of AC 4-AC 6-AC 5, an order of AC 5-AC 4-AC 6, an order of AC 5-AC 6-AC 4, an order of AC 6-AC 5-AC 4, and an order of AC 6-AC 4-AC 5, may be changed.

In order to effectively transmit a request message for "SIP signaling (or IMS signaling) for non-service attempt", the NAS layer may memorize whether or not each access category is barred. For example, when the NAS layer transmits a request message including information on an access category related to an IMS service attempt to the RRC layer and receives barring information for the request message from the RRC layer, the NAS layer may store this information.

As an example, the NAS layer may store barring information for a plurality of access categories related to an IMS service attempt, such as AC 4: barred/AC 5: not barred (or allowed)/AC 6: unknown, etc. Barred may mean that a request previously attempted by the NAS layer was barred, and not barred may mean that a request previously attempted by the NAS layer was not barred (or allowed). Unknown may mean that the NAS layer does not know whether the corresponding access category is barred.

Here, the NAS layer may store barring information for a plurality of access categories related to an IMS service attempt, based on a response (barring or allowing) to the request message transmitted to the RRC layer. Alternatively, the NAS layer may receive barring information for a plurality of access categories related to IMS service attempts from the RRC layer in steps S805a and/or S805b of FIG. 8.

The NAS layer may determine an access category for "SIP signaling (or IMS signaling) for a non-service attempt", based on barring information for a plurality of access categories related to the IMS service attempt. For example, the NAS layer may determine a first access category, a second access category, and/or a third access category based on barring information for a plurality of access categories related to the IMS service attempt.

The NAS layer may determine an access category for "SIP signaling (or IMS signaling) for a non-service attempt", based on specific barring information for a plurality of access categories related to the IMS service attempt. For example, the NAS layer determine a first access category, a second access category, and/or a third access in the order of an access category having a low barring factor, based on the detailed barring information for each access category provided from the RRC layer.

As in the above example, if the NAS layer remembers whether each access category is barred or not, when the NAS layer receives a request for IMS signaling from the IMS layer, the NAS layer may request an access attempt to a lower layer (eg, an RRC layer) using an access category related to IMS service attempt (e.g. an access category 5), which is stored as "not barred"

For example, the NAS layer may store information on whether each access category is barred or not (eg, AC 4: barred/AC 5: not barred (or allowed)/AC 6: unknown). In this case, the IMS layer transmits a request message including information/indication related to "SIP signaling (or IMS signaling) for non-service attempt" and information on the first access category (eg, AC 4) to the NAS layer. Then, the NAS layer may request an access attempt by transmitting a request message including information on AC 5 to the RRC layer, even if the IMS layer provides information on AC 4.

The following drawings were created to explain a specific example of the present specification. The names of specific devices described in the drawings or the names of specific signals/messages/fields are presented by way of example, so that the technical features of the present specification are not limited to the specific names used in the following drawings.

Figure 10:
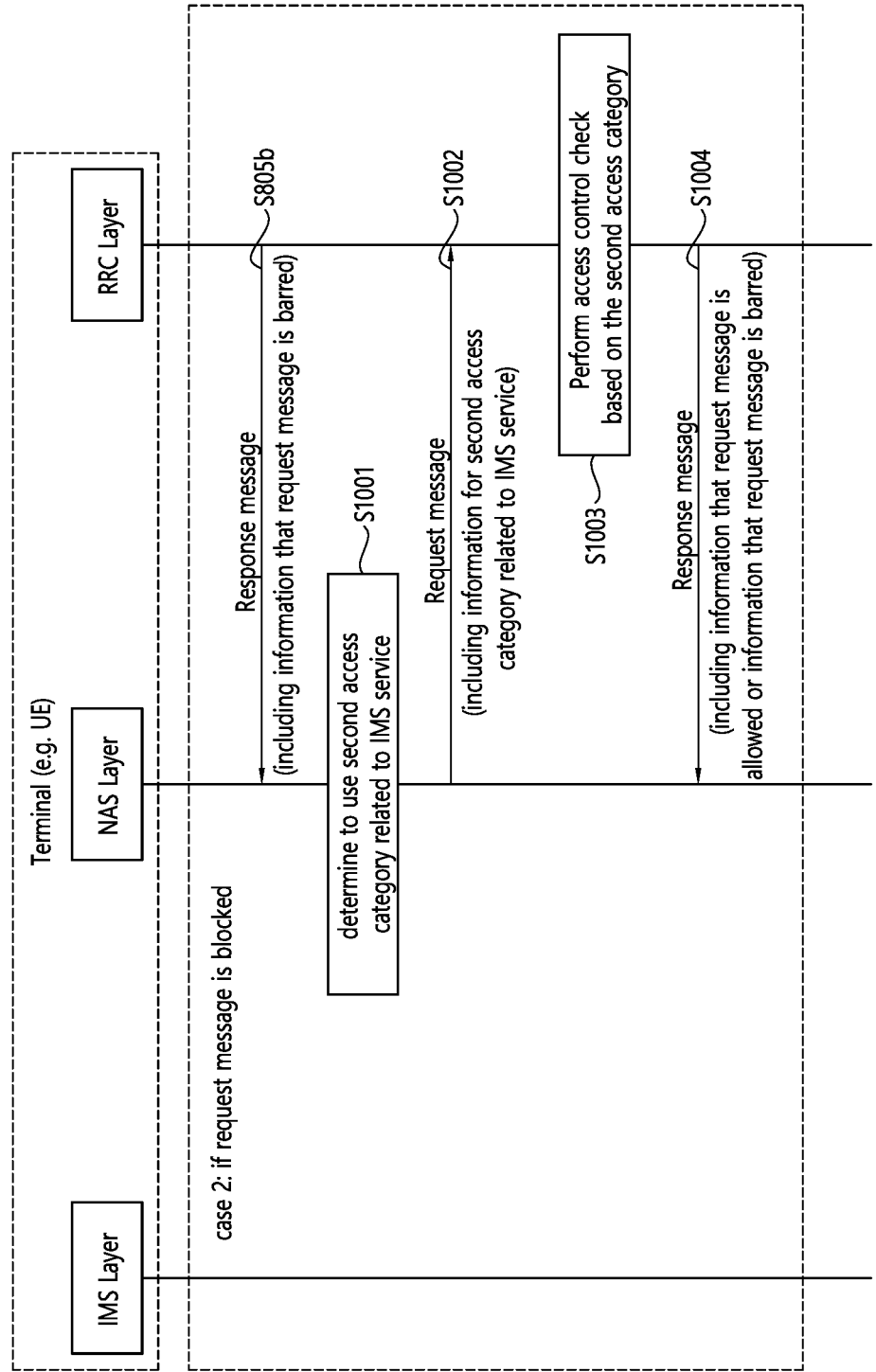
FIG. 10 is an exemplary signal flow diagram illustrating operations in accordance with an example of the disclosure herein.

FIG. 10 is an exemplary signal flow diagram illustrating operations in accordance with an example of the disclosure herein.

For reference, the operations shown in FIG. 10 are only examples, and the scope of the disclosure of the present specification for operations performed by the IMS layer, NAS layer, RRC layer and/or PDCP layer is not limited by the example of FIG. 10.

Step S805b shown in FIG. 10 is the same as step S805b of FIG. 8.

In step S1001, the NAS layer may determine to use an access category different from the first access category (eg, a second access category) among a plurality of access categories related to the IMS service attempt. In other words, the NAS layer may retry the IMS signaling for the non-service attempt using the second access category. For example, when the first access category is access category 4, the IMS layer may use one of access category 5 or access category 6 as the second access category.

When the request message of step S805b includes barring information for a plurality of access categories related to the IMS service attempt, the NAS layer may determine the second access category based on the barring information for the plurality of access categories. For example, if the information that the access category 5 and the access category 6 are not barred is stored in the barring information for a plurality of access categories related to the IMS service attempt, the NAS layer may determine the access category 5 or the access category 6 as the second access category.

The NAS layer may memorize whether or not each access category is barred. As an example, the NAS layer may store information on whether each access category is barred or not, such as AC 4: barred/AC 5: not barred (or allowed)/AC 6: unknown.

In step S1002, the NAS layer may transmit a request message to the NAS layer. Here, the request message may include information on the second access category (eg, access category 5) related to the IMS service.

In step S1003, the RRC layer may be in a state in which access control is being applied due to network congestion or the like. Since the RRC layer has received information on the second access category (eg, access category 5) from the NAS layer, it may perform an access control check based on the second access category (eg, access category 5).

When no access control is applied for the second access category (eg, access category 5) (eg, when the priority of an access category barred according to access control is lower than access category 5), the RRC layer may accept a request message received from the NAS layer. The RRC layer may transmit information indicating that the request message is allowed (eg, "not barred" information) to the NAS layer. When the request message is accepted, transmission of the request message (including information related to IMS signaling for non-service attempt), performed by the RRC layer to the network, in the same manner as the operation related to case 1 of FIGS. 8 and 9 described above may be performed.

When access control is applied for the second access category (eg, access category 5) (eg, when the priority of an access category barred according to access control is higher than access category 5), the RRC layer may bar a request message received from the NAS layer. The RRC layer may transmit information that the request message is barred (eg, "barred" information) to the NAS layer.

As such, when the retry of the IMS signaling based on the second access category fails, the NAS layer of the terminal selectively once again includes information on a request message (a third access category (eg, access category 6) related to the IMS service) may be transmitted to the RRC layer of the terminal. The RRC layer may perform an access control check based on the third access category.

In the above example, after the failure of the IMS signaling transmission request using the access category 4, the IMS signaling transmission request retry using the access category 5 and the IMS signaling transmission request retry using the access category 6 may be sequentially performed. In addition, the order in which the access categories are used for IMS signaling transmission request retry may be changed according to the implementation of the terminal or the policy of the operator.

According to the disclosure of the present specification described based on various drawings and examples, when it is necessary to transmit IMS signaling for a non-service request in a situation in which access control is being applied due to a network congestion situation, etc., it is possible to continuously provide IMS services such as voice calls, video calls, and SMS that the user wants to use to the user's terminal, by allowing access control to be bypassed.

For reference, the operation of the UE described in this specification may be implemented by the apparatus of FIGS. 11 to 16 to be described below. For example, the UE may be the first wireless device 100 or the second wireless device 200 of FIG. 12. For example, operations of a UE described herein may be handled by one or more processors 102 or 202. The operations of the UE described herein may be stored in one or more memories 104 or 204 in the form of instructions/programs (e.g., executable code) executable by one or more processors 102 or 202. The one or more processors 102 or 202 control one or more memories 104 or 204 and one or more transceivers 106 or 206, and execute instructions/programs stored in the one or more memories 104 or 204 to be used in the present specification. The operation of the UE described in the disclosure may be performed.

In addition, the instructions for performing the operation of the UE described in the disclosure of the present specification may be stored in a non-volatile computer-readable storage medium in which it is recorded. The storage medium may be included in one or more memories 104 or 204. In addition, the instructions recorded in the storage medium may be executed by one or more processors 102 or 202 to perform the operation of the UE described in the disclosure of the present specification.

For reference, the operation of the network node (eg, P-CSCF, AMF, etc.) described in this specification may be implemented by the apparatus of FIGS. 11 to 17 to be described below. For example, the network node may be the first wireless device 100 or the second wireless device 200 of FIG. 12. For example, the operation of the network nodes described herein may be handled by one or more processors 102 or 202. The operations of the network nodes described herein may be stored in one or more memories 104 or 204 in the form of instructions/programs (e.g. instructions, executable code) executable by one or more processors 102 or 202. The one or more processors 102 or 202 control one or more memories 104 or 204 and one or more transceivers 106 or 206, and execute instructions/programs stored in the one or more memories 104 or 204 to be used in the present specification. The operation of the network node described in the disclosure may be performed.

V. Examples to which the Disclosure of this Specification is to be Applied

While not limited to thereto, the various descriptions, functions, procedures, suggestions, methods, and/or operational flowcharts of the present specification disclosed herein may be applied to in various fields requiring wireless communication/connection (e.g., 5G) between devices.

Hereinafter, a communication system to which the present specification can be applied is described in more detail with reference to the drawings. The same reference numerals in the following drawings/descriptions may illustrate the same or corresponding hardware blocks, software blocks, or functional blocks unless otherwise indicated.

Figure 11:
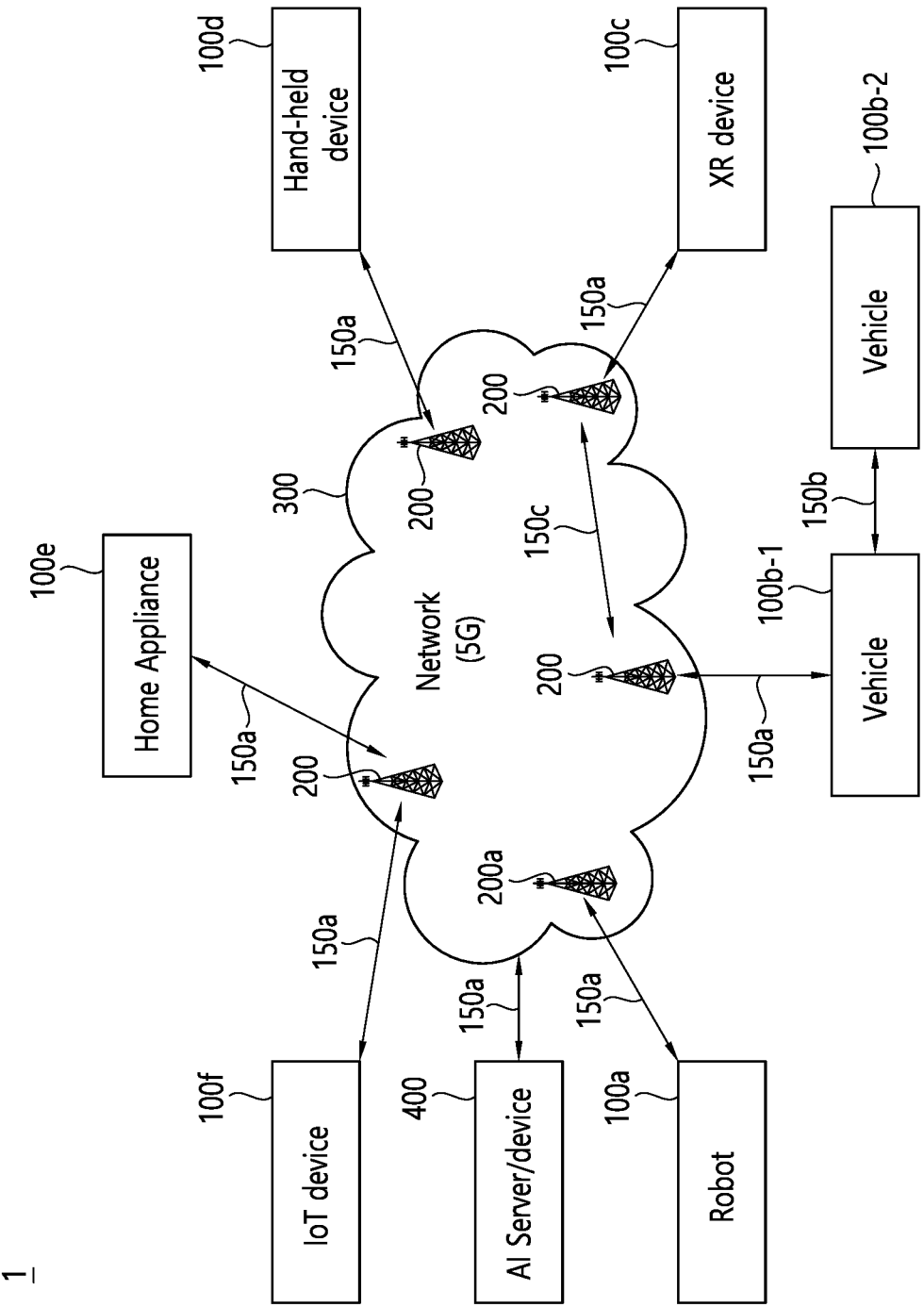
FIG. 11 illustrates a communication system 1 that can be applied to the present specification.

FIG. 11 illustrates a communication system 1 that can be applied to the present specification.

Referring to FIG. 11, a communication system 1 applied to the present specification includes a wireless device, a base station, and a network. Here, the wireless device means a device that performs communication using a wireless access technology (e.g., 5G New RAT (Long Term), Long Term Evolution (LTE)), and may be referred to as a communication/wireless/5G device. Although not limited thereto, the wireless device may include a robot 100a, a vehicle 100b-1, 100b-2, an eXtended Reality (XR) device 100c, a hand-held device 100d, a home appliance 100e, an Internet of Thing (IoT) device 100f, and the AI device/server 400. For example, the vehicle may include a vehicle having a wireless communication function, an autonomous vehicle, a vehicle capable of performing inter-vehicle communication, and the like. Here, the vehicle may include an unmanned aerial vehicle (UAV) (e.g., a drone). XR device may include AR (Augmented Reality)/VR (Virtual Reality)/MR (Mixed Reality) device. XR device may be implemented in the form of Head-Mounted Device (HMD), Head-Up Display (HUD), television, smartphone, a computer, a wearable device, a home appliance, a digital signage, a vehicle, a robot, and the like. The mobile device may include a smartphone, a smart pad, a wearable device (e.g., smart watch, smart glasses), and a computer (e.g., a laptop, etc.). The home appliance may include a TV, a refrigerator, a washing machine, and the like. IoT devices may include sensors, smart meters, and the like. For example, the base station and the network may be implemented as a wireless device, and the specific wireless device 200a may operate as a base station/network node to other wireless devices.

The wireless devices 100a to 100f may be connected to the network 300 through the base station 200. AI (Artificial Intelligence) technology may be applied to the wireless devices 100a to 100f, and the wireless devices 100a to 100f may be connected to the AI server 400 through the network 300. The network 300 may be configured using a 3G network, a 4G (e.g. LTE) network, a 5G (e.g. NR) network, or the like. The wireless devices 100a-100f may communicate with each other via the base station 200/network 300, but may also communicate directly (e.g. sidelink communication) without passing through the base station/network. For example, the vehicles 100b-1 and 100b-2 may perform direct communication (e.g. vehicle to vehicle (V2V)/vehicle to everything (V2X) communication). In addition, the IoT device (e.g. sensor) may directly communicate with another IoT device (e.g. sensor) or another wireless device 100a to 100f.

A wireless communication/connection 150a, 150b, 150c may be performed between the wireless devices 100a-100f/base station 200 and base station 200/base station 200. Here, the wireless communication/connection is implemented based on various wireless connections (e.g., 5G NR) such as uplink/downlink communication 150a, sidelink communication 150b (or D2D communication), inter-base station communication 150c (e.g. relay, integrated access backhaul), and the like. The wireless device and the base station/wireless device, the base station, and the base station may transmit/receive radio signals to each other through the wireless communication/connections 150a, 150b, and 150c. For example, wireless communications/connections 150a, 150b, 150c may transmit/receive signals over various physical channels. To this end, based on various proposals of the present specification, At least some of various configuration information setting processes for transmitting/receiving a wireless signal, various signal processing processes (e.g., channel encoding/decoding, modulation/demodulation, resource mapping/demapping, etc.) may be performed.

Figure 12:
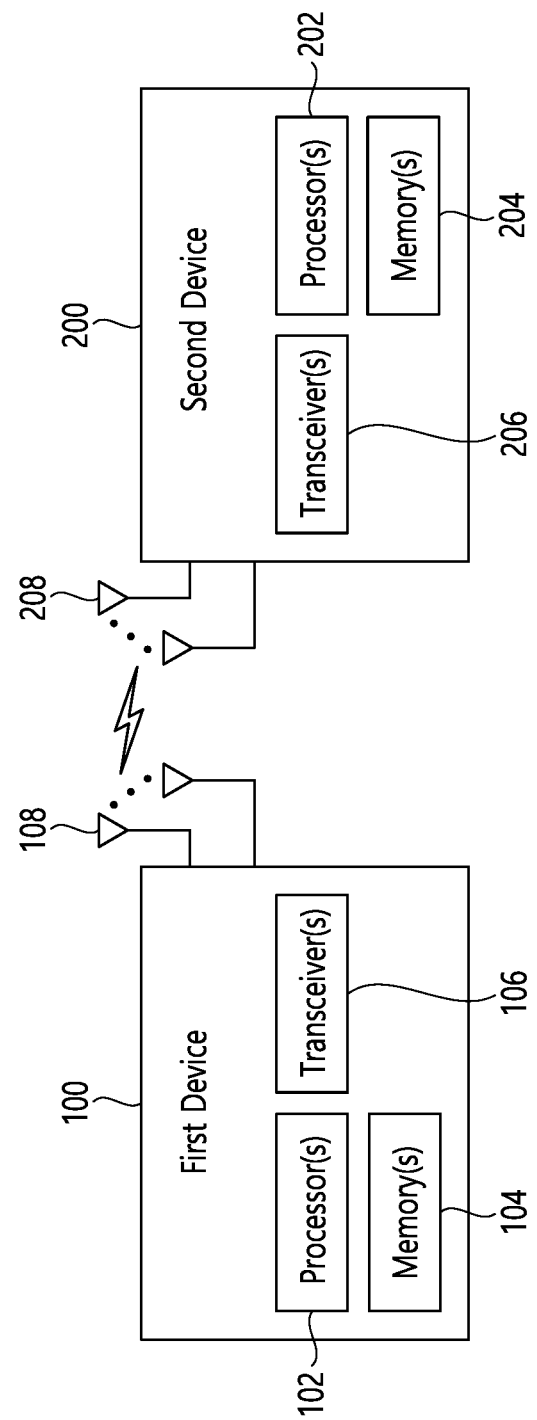
FIG. 12 illustrates an example of a wireless device that can be applied to the present specification.

FIG. 12 illustrates an example of a wireless device that can be applied to the present specification.

Referring to FIG. 12, the first wireless device 100 and the second wireless device 200 may transmit and receive wireless signals through various wireless access technologies (e.g., LTE and NR). Here, the {first wireless device 100 and the second wireless device 200} may refer to the {wireless device 100x, the base station 200} and/or the {wireless device 100x, the wireless device 100x of FIG. 11}. Alternatively, the first wireless device 100 may correspond to the UE, AMF, SMF, or UPF described in the disclosure of the present specification. In addition, the second wireless device 200 may correspond to a UE, AMF, SMF, or UPF that communicates with the first wireless device 100. The first wireless device 100 includes one or more processors 102 and one or more memories 104, and may further include one or more transceivers 106 and/or one or more antennas 108. The processor 102 controls the memory 104 and/or the transceiver 106 and may be configured to implement the descriptions, functions, procedures, suggestions, methods and/or operational flowcharts disclosed herein. For example, the processor 102 may process the information in the memory 104 to generate a first information/signal, and then transmit the wireless signal including the first information/signal through the transceiver 106. In addition, the processor 102 may receive the radio signal including a second information/signal through the transceiver 106 and store the information obtained from the signal processing of the second information/signal in the memory 104. The memory 104 may be connected to the processor 102 and may store various information related to the operation of the processor 102. For example, the memory 104 may store software code that includes instructions to perform some or all of the processes controlled by the processor 102 or to perform descriptions, functions, procedures, suggestions, methods and/or operational flowcharts disclosed herein. Here, the processor 102 and memory 104 may be part of a communication modem/circuit/chip designed to implement wireless communication technology (e.g., LTE, NR). The transceiver 106 may be coupled with the processor 102 and may transmit and/or receive wireless signals via one or more antennas 108. The transceiver 106 may include a transmitter and/or a receiver. The transceiver 106 may be described as being mixed with a radio frequency (RF) unit. In the present specification, a wireless device may mean a communication modem/circuit/chip.

The second wireless device 200 may include one or more processors 202, one or more memories 204, and may further include one or more transceivers 206 and/or one or more antennas 208. The processor 202 controls the memory 204 and/or the transceiver 206 and may be configured to implement the descriptions, functions, procedures, suggestions, methods and/or operational flowcharts disclosed herein. For example, the processor 202 may process the information in the memory 204 to generate third information/signal, and then transmit a wireless signal including the third information/signal through the transceiver 206. In addition, the processor 202 may receive the radio signal including the fourth information/signal through the transceiver 206 and then store the information obtained from the signal processing of the fourth information/signal in the memory 204. The memory 204 may be connected to the processor 202 and store various information related to the operation of the processor 202. For example, the memory 204 may store software code that include instructions to perform some or all of the processes controlled by the processor 202 or to perform descriptions, functions, procedures, suggestions, methods and/or operational flowcharts disclosed herein. Here, processor 202 and memory 204 may be part of a communication modem/circuit/chip designed to implement wireless communication technology (e.g., LTE, NR). The transceiver 206 may be coupled with the processor 202 and may transmit and/or receive wireless signals via one or more antennas 208. The transceiver 206 may include a transmitter and/or a receiver. The transceiver 206 may be described being mixed with an RF unit. In the present specification, a wireless device may mean a communication modem/circuit/chip.

Hereinafter, hardware elements of the wireless devices 100 and 200 will be described in more detail. One or more protocol layers may be implemented by one or more processors 102, 202. The hardware elements of the wireless devices 100 and 200 are not limited thereto. For example, one or more processors 102 and 202 may implement one or more layers (e.g., functional layers such as PHY, MAC, RLC, PDCP, RRC, SDAP). One or more processors 102, 202 may generate one or more Protocol Data Units (PDUs) and/or one or more Service Data Units (SDUs) based on the descriptions, functions, procedures, suggestions, methods and/or operational flowcharts disclosed herein. One or more processors 102, 202 may generate messages, control information, data or information in accordance with the descriptions, functions, procedures, suggestions, methods and/or operational flowcharts disclosed herein. One or more processors 102, 202 may generate signals (e.g., baseband signals) including PDUs, SDUs, messages, control information, data or information in accordance with the functions, procedures, suggestions and/or methods disclosed herein, and may provide the signals to one or more transceivers 106 and 206. One or more processors 102, 202 may receive signals (e.g., baseband signals) from one or more transceivers 106, 206 and may obtain the PDU, the SDU, the message, the control information, the data, or the information based on a description, functions, procedures, suggestions, methods, and/or operational flowcharts disclosed herein.

The descriptions, functions, procedures, suggestions, methods, and/or operational flowcharts disclosed herein may be implemented using firmware or software, and the firmware or software may be implemented to include modules, procedures, functions, and the like. Firmware or software configured to perform the descriptions, functions, procedures, suggestions, methods, and/or operational flowcharts disclosed herein may be included in one or more processors (102, 202), or may be stored in one or more memories (104, 204) and be executed by the processor (102, 202). The descriptions, functions, procedures, suggestions, methods, and/or operational flowcharts disclosed herein may be implemented using firmware or software in the form of code, instructions, and/or a set of instructions.

One or more memories 104, 204 may be coupled with one or more processors 102, 202 and may store various forms of data, signals, messages, information, programs, codes, instructions, and/or instructions. One or more memories 104, 204 may be comprised of ROM, RAM, EPROM, flash memory, hard drive, registers, cache memory, computer readable storage medium, and/or combinations thereof. One or more memories 104, 204 may be located inside and/or outside one or more processors 102, 202. In addition, one or more memories 104, 204 may be coupled with one or more processors 102, 202 through various techniques, such as a wired or wireless connection.

One or more transceivers 106 and 206 may transmit user data, control information, wireless signals/channels, etc., as mentioned in the methods and/or operational flowcharts of this document, to one or more other devices. One or more transceivers 106 and 206 may receive, from one or more other devices, user data, control information, wireless signals/channels, etc., as mentioned in the descriptions, functions, procedures, suggestions, methods and/or operational flowcharts disclosed herein. For example, one or more transceivers 106 and 206 may be coupled with one or more processors 102 and 202 and may transmit and receive wireless signals. For example, one or more processors 102 and 202 may control one or more transceivers 106 and 206 to transmit user data, control information or wireless signals to one or more other devices. In addition, one or more processors 102 and 202 may control one or more transceivers 106 and 206 to receive user data, control information or wireless signals from one or more other devices. In addition, one or more transceivers 106, 206 may be coupled with one or more antennas 108, 208. One or more transceivers 106, 206 may be configured to transmit and receive user data, control information, wireless signals/channels, etc., which are mentioned in the procedures, functions, descriptions, suggestions, methods and/or operational flowcharts, and the like via one or more antennas 108, 208. In the present disclosure, one or more antennas may be a plurality of physical antennas or a plurality of logical antennas (e.g., antenna ports). One or more transceivers 106, 206 may convert the received wireless signal/channel or the like from RF band signal to a baseband signal to process user data, control information, wireless signals/channels, etc. in an one or more processors 102, 202. One or more transceivers 106 and 206 may use the one or more processors 102 and 202 to convert processed user data, control information, wireless signals/channels, etc. from baseband signals to RF band signals. To this end, one or more transceivers 106 and 206 may include (analog) oscillators and/or filters.

Figure 13:
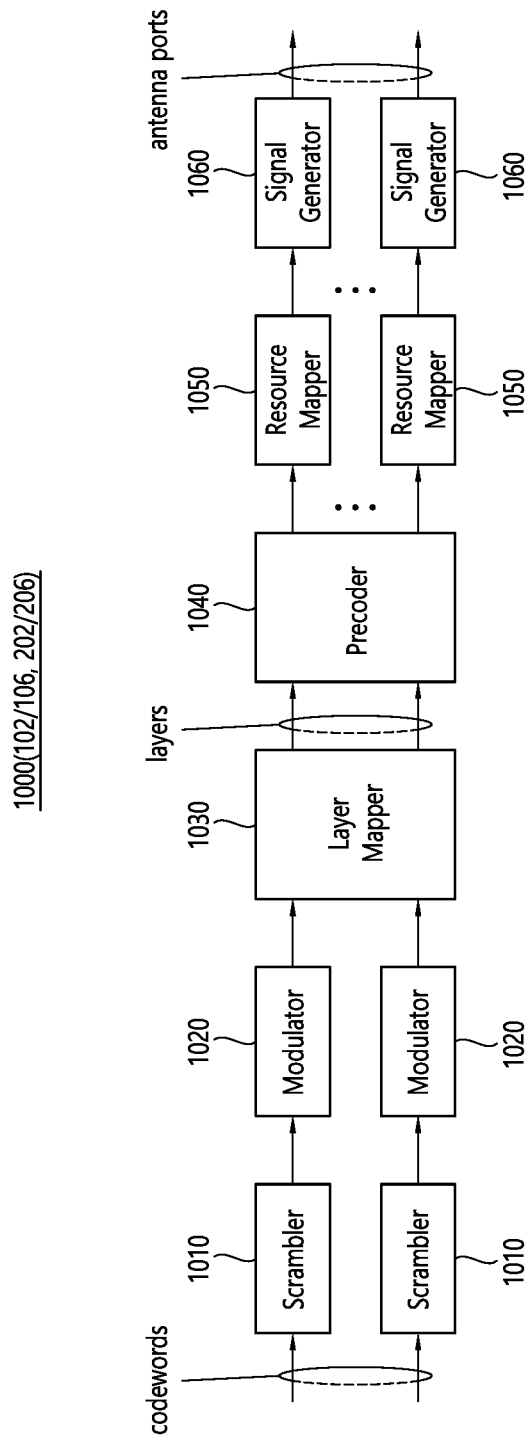
FIG. 13 illustrates an example of a signal processing circuit for a transmission signal that can be applied to the present specification.

FIG. 13 illustrates an example of a signal processing circuit for a transmission signal.

Referring to FIG. 13, the signal processing circuit 1000 may include a scrambler 1010, a modulator 1020, a layer mapper 1030, a precoder 1040, a resource mapper 1050, and a signal generator 1060. Although not limited thereto, the operations/functions of FIG. 13 may be performed in the processor (102, 202), the memory (104, 204) and/or transceiver (106, 206) of FIG. 12. The hardware element of FIG. 13 may be implemented in the processors 102 and 202 and/or the transceivers 106 and 206 of FIG. 12. For example, blocks 1010-1060 may be implemented in the processors 102, 202 of FIG. 12. Also, blocks 1010-1050 may be implemented in the processors 102 and 202 of FIG. 12, and block 1060 may be implemented in the transceivers 106 and 206 of FIG. 12.

The codeword may be converted into a wireless signal through the signal processing circuit 1000 of FIG. 13. Here, the codeword is an encoded bit sequence of the information block. The information block may include a transport block (e.g., a UL-SCH transport block and a DL-SCH transport block). The wireless signal may be transmitted through various physical channels (e.g., PUSCH, PDSCH).

In detail, the codeword may be converted into a scrambled bit sequence by the scrambler 1010. The scramble sequence used for scramble is generated based on the initialization value, and the initialization value may include ID information of the wireless device. The scrambled bit sequence may be modulated into a modulation symbol sequence by the modulator 1020. The modulation scheme may include pi/2-Binary Phase Shift Keying (pi/2-BPSK), m-Phase Shift Keying (m-PSK), m-Quadrature Amplitude Modulation (m-QAM), and the like. The complex modulation symbol sequence may be mapped to one or more transport layers by the layer mapper 1030. The modulation symbols of each transport layer may be mapped (precoding) to the corresponding antenna port(s) by the precoder 1040. The output z of the precoder 1040 may be obtained by multiplying the output y of the layer mapper 1030 by the precoding matrix W of N*M. Where N is the number of antenna ports and M is the number of transport layers. Here, the precoder 1040 may perform precoding after performing transform precoding (e.g., DFT transform) on complex modulation symbols. Also, the precoder 1040 may perform precoding without performing transform precoding.

The resource mapper 1050 may map modulation symbols of each antenna port to time-frequency resources. The time-frequency resource may include a plurality of symbols (e.g., CP-OFDMA symbols, DFT-s-OFDMA symbols) in the time domain, and may include a plurality of subcarriers in the frequency domain. The signal generator 1060 generates a radio signal from the mapped modulation symbols, and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

The signal processing procedure for the received signal in the wireless device may be configured in the reverse manner of the signal processing procedures 1010-1060 of FIG. 13. For example, a wireless device (e.g., 100 and 200 of FIG. 12) may receive a wireless signal from the outside through an antenna port/transceiver. The received wireless signal may be converted into a baseband signal through a signal recoverer. To this end, the signal recoverer may include a frequency downlink converter, an analog-to-digital converter (ADC), a CP canceller, and a fast fourier transform (FFT) module. Thereafter, the baseband signal may be restored to a codeword through a resource de-mapper process, a postcoding process, a demodulation process, and a de-scramble process. The codeword may be restored to the original information block through decoding. Thus, signal processing circuitry (not shown) for the received signal may include a signal recoverer, a resource de-mapper, a postcoder, a demodulator, a de-scrambler and a decoder.

Figure 14:
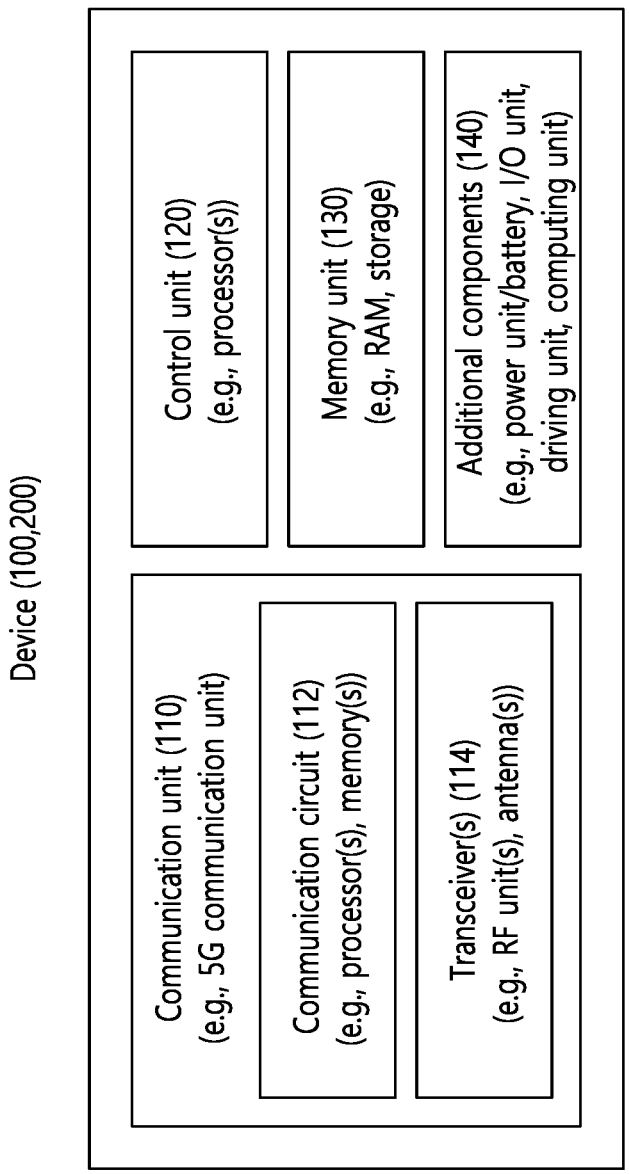
FIG. 14 illustrates another example of a wireless device that can be applied to the present specification.

FIG. 14 illustrates another example of a wireless device that can be applied to the present specification.

The wireless device may be implemented in various forms according to use-examples/services (refer to FIG. 11).

Referring to FIG. 14, the wireless devices 100 and 200 correspond to the wireless devices 100 and 200 of FIG. 12, and the wireless devices 100 and 200 may be configured with various elements, components, units, and/or modules. For example, the wireless device 100, 200 may include a communication unit 110, a control unit 120, a memory unit 130, and additional components 140. The communication unit may include communication circuit 112 and transceiver(s) 114. For example, the communication circuit 112 may include one or more processors 102, 202 and/or one or more memories 104, 204 of FIG. 12. For example, the transceiver(s) 114 may include one or more transceivers 106, 206 and/or one or more antennas 108, 208 of FIG. 12. The control unit 120 is electrically connected to the communication unit 110, the memory unit 130, and the additional components 140, and controls various operations of the wireless device. For example, the control unit 120 may control the electrical/mechanical operation of the wireless device based on the program/code/command/information stored in the memory unit 130. In addition, the control unit 120 may transmit information stored in the memory unit 130 to the outside (e.g., another communication device) through the communication unit 110 through a wireless/wired interface. The control unit 120 may store the information received through the wireless/wired interface from the outside (e.g., another communication device) through the communication unit 110 in the memory unit 130. For example, the control unit 120 may include one or more processors 102 and 202 and/or one or more memories 104 and 204 of FIG. 12. For example, the memory unit 130 may include one or more memories 104 and 204 of FIG. 12.

The additional components 140 may be variously configured according to the type of the wireless device. For example, the additional components 140 may include at least one of a power unit/battery, an input/output unit, a driving unit, and a computing unit. Although not limited thereto, the wireless device may be implemented in the form of a robot (FIG. 11, 100a), a vehicle (FIG. 11, 100b-1, 100b-2), an XR device (FIG. 11, 100c), a portable device (FIG. 11, 100d), a home appliance. (FIG. 11, 100e), IoT devices (FIG. 11, 100f), terminals for digital broadcasting, hologram devices, public safety devices, MTC devices, medical devices, fintech devices (or financial devices), security devices, climate/environment devices, an AI server/device (FIGS. 12 and 400), a base station (FIGS. 12 and 200), a network node, and the like. The wireless device may be used in a mobile or fixed location depending on the usage-example/service.

In FIG. 14, various elements, components, units/units, and/or modules in the wireless devices 100 and 200 may be entirely interconnected through a wired interface, or at least a part of them may be wirelessly connected through the communication unit 110. For example, the control unit 120 and the communication unit 110 are connected by wire in the wireless device 100 or 200, and the control unit 120 and the first unit (e.g., 130 and 140) are connected wirelessly through the communication unit 110. In addition, each element, component, unit/unit, and/or module in wireless device 100, 200 may further include one or more elements. For example, the control unit 120 may be composed of one or more processor sets. For example, the control unit 120 may be configured as a set of a communication control processor, an application processor, an electronic control unit (ECU), a graphics processing processor, a memory control processor, and the like. As another example, the memory unit 130 may include random access memory (RAM), dynamic RAM (DRAM), read only memory (ROM), flash memory, volatile memory, and non-volatile memory and/or combinations thereof.

Figure 15:
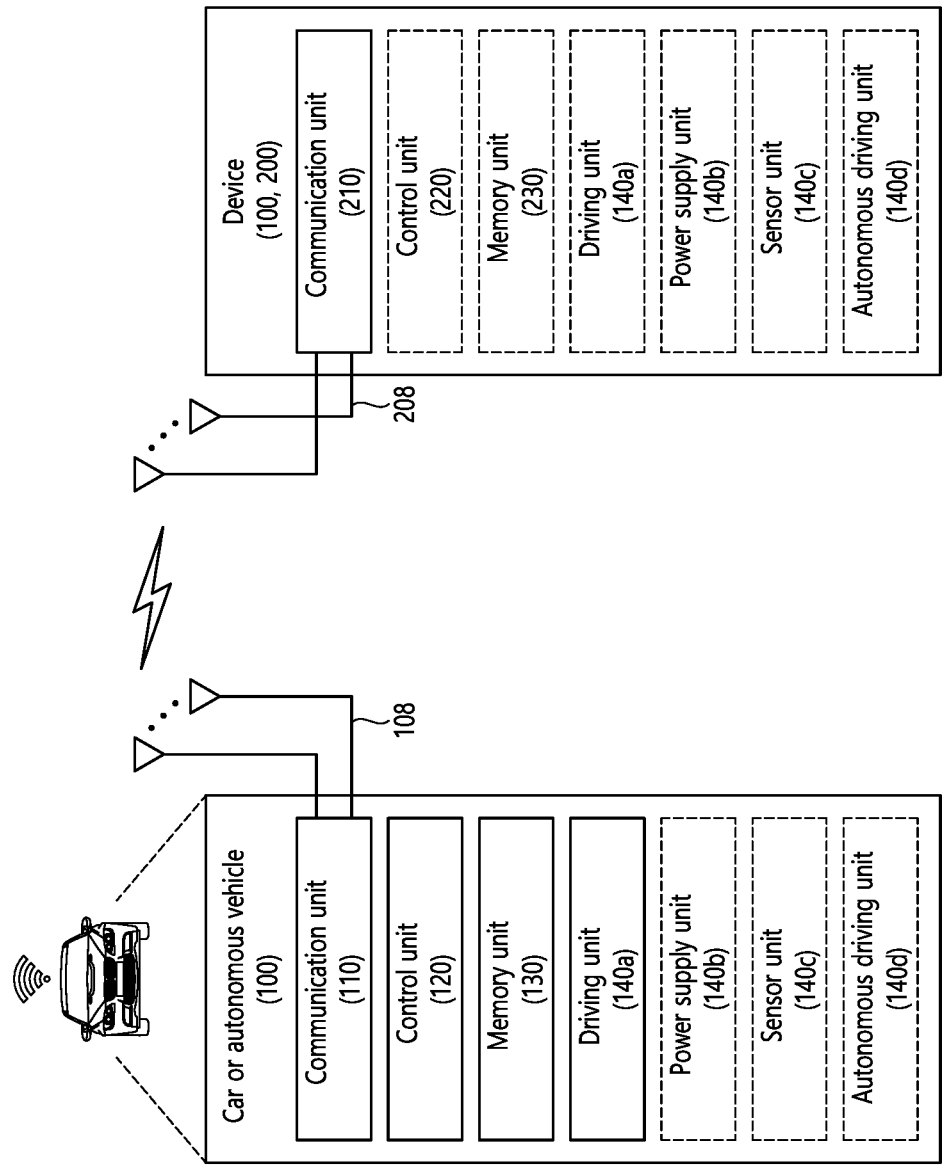
FIG. 15 illustrates an example of a vehicle or an autonomous vehicle that can be applied to the present specification.

FIG. 15 illustrates an example of a vehicle or an autonomous vehicle that can be applied to the present specification.

FIG. 15 illustrates a vehicle or autonomous vehicle applied to the disclosure of this specification. The vehicle or autonomous driving vehicle may be implemented as a mobile robot, a vehicle, a train, an aerial vehicle (AV), a ship, and the like.

Referring to FIG. 15, the vehicle or the autonomous vehicle 100 may include an antenna unit 108, a communication unit 110, a control unit 120, a driving unit 140a, a power supply unit 140b, a sensor unit 140c, and autonomous driving unit 140d. The antenna unit 108 may be configured as part of the communication unit 110. The blocks 110/130/140a to 140d may correspond to blocks 110/130/140 of FIG. 14, respectively.

The communication unit 110 may transmit or receive signals (e.g., data, control signals, etc.) with external devices, such as base stations (e.g. base stations, road side units, etc.), servers, and the like. The control unit 120 may control various elements of the vehicle or the autonomous vehicle 100 to perform various operations. The control unit 120 may include an ECU (Electronic Control Unit). The driving unit 140a may cause the vehicle or the autonomous vehicle 100 to drive on the ground. The driving unit 140a may include an engine, a motor, a power train, wheels, a brake, a steering device, and the like. The power supply unit 140b supplies power to the vehicle or the autonomous vehicle 100, and may include a wired/wireless charging circuit, a battery, and the like. The sensor unit 140c may obtain vehicle status, surrounding environment information, user information, and the like. The sensor unit 140c includes an inertial measurement unit (IMU) sensor, a collision sensor, a wheel sensor, a speed sensor, an inclination sensor, a weight sensor, a heading sensor, a position module, a position forward, and a vehicle forward/reverse sensors, battery sensors, fuel sensors, tire sensors, steering sensors, temperature sensors, humidity sensors, ultrasonic sensors, illuminance sensors, pedal position sensors, and the like. The autonomous driving unit 140d may implement a technology for maintaining a driving lane, a technology for automatically adjusting speed such as adaptive cruise control, a technology for automatically driving along a predetermined route, and automatically setting a route when a destination, and the like.

For example, the communication unit 110 may receive map data, traffic information data, and the like from an external server. The autonomous driving unit 140d may generate an autonomous driving route and a driving plan based on the obtained data. The control unit 120 may control the driving unit 140a to move the vehicle or the autonomous vehicle 100 along the autonomous driving path according to the driving plan (e.g., speed/direction adjustment). During autonomous driving, the communication unit 110 may acquire the latest traffic information data periodically or aperiodically from an external server and may obtain the surrounding traffic information data from the surrounding vehicles. In addition, during autonomous driving, the sensor unit 140c may acquire vehicle state and surrounding environment information. The autonomous driving unit 140d may update the autonomous driving route and the driving plan based on the newly obtained data/information. The communication unit 110 may transmit information regarding a vehicle location, an autonomous driving route, a driving plan, and the like to an external server. The external server may predict traffic information data in advance using AI technology or the like based on information collected from the vehicle or autonomous vehicles, and provide the predicted traffic information data to the vehicle or autonomous vehicles.

Figure 16:
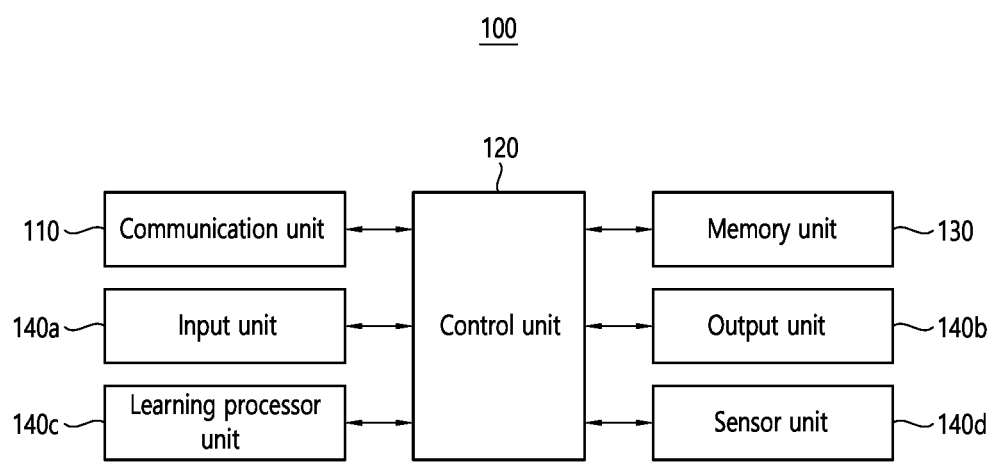
FIG. 16 illustrates an example of an AI device that can be applied to the disclosure of the present specification.

FIG. 16 illustrates an example of an AI device that can be applied to the disclosure of the present specification.

FIG. 16 illustrates an example of an AI device applied to the disclosure of the present specification. An AI device may be implemented as a fixed device or a mobile device, such as TVs, projectors, smartphones, PCs, laptops, digital broadcasting terminals, tablet PCs, wearable devices, set-top boxes (STBs), radios, washing machines, refrigerators, digital signage, robots, vehicles, and the like.

Referring to FIG. 16, the AI device 100 includes a communication unit 110, a control unit 120, a memory unit 130, an input/output unit 140a/140b, a learning processor unit 140c, and a sensor unit 140d. Blocks 110 to 130/140a to 140d respectively correspond to blocks 110 to 130/140 of FIG. 14.

The communication unit 110 communicates may transmit or receive wired signals and wireless signals (e.g., sensor information, user input, learning model, control signal, etc.) with external devices such as another AI device (e.g., FIG. 1, 100x, 200, 400) or an AI server (e.g., 400 of FIG. 11) by using a wired or wireless communication technology. To this end, the communication unit 110 may transmit information in the memory unit 130 to an external device, or may transmit a signal received from the external device to the memory unit 130.

The control unit 120 may determine at least one executable operation of the AI device 100 based on the information determined or generated using the data analysis algorithm or the machine learning algorithm. In addition, the control unit 120 may control the components of the AI device 100 to perform the determined operation. For example, the control unit 120 may request, search, receive, or utilize data of the running processor 140c or the memory 130. The control unit 120 may control the components of the AI device 100 to execute a predicted or desirable operation among at least one executable operation. In addition, the control unit 120 collects history information including the operation contents of the AI device 100 or the user's feedback on the operation, and stores the information in the memory unit 130 or the running processor unit 140c or transmits the information to an external device such as an AI server (FIG. 11, 400). The collected historical information can be used to update the learning model.

The memory unit 130 may store data supporting various functions of the AI device 100. For example, the memory unit 130 may store data obtained from the input unit 140a, data obtained from the communication unit 110, output data of the learning processor unit 140c, and data obtained from the sensing unit 140. In addition, the memory unit 130 may store control information and/or software code necessary for operation/execution of the control unit 120.

The input unit 140a may obtain various types of data from the outside of the AI device 100. For example, the input unit 140a may acquire training data for model learning, input data to which the training model is applied, and the like. The input unit 140a may include a camera, a microphone, and/or a user input unit. The output unit 140b may generate an output related to sight, hearing, or touch. The output unit 140b may include a display unit, a speaker, and/or a haptic module. The sensing unit 140 may obtain at least one of internal information of the AI device 100, environment information of the AI device 100, and user information using various sensors. The sensing unit 140 may include a proximity sensor, an illumination sensor, an acceleration sensor, a magnetic sensor, a gyro sensor, an inertial sensor, an RGB sensor, an IR sensor, a fingerprint sensor, an ultrasonic sensor, an optical sensor, a microphone, and/or a radar, and the like.

The learning processor unit 140c may train a model composed of artificial neural networks using the training data. The learning processor unit 140c may perform AI processing together with the learning processor unit of the AI server (FIGS. 12 and 400). The learning processor unit 140c may process information received from an external device through the communication unit 110 and/or information stored in the memory unit 130. In addition, the output value of the learning processor unit 140c may be transmitted to the external device through the communication unit 110 and/or stored in the memory unit 130.

As described above, although the embodiments have been described as examples, since the content and scope of this specification will not be limited only to a particular embodiment of this specification, this specification may be amended, modified, or enhanced to other various forms.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for a terminal to perform communication related to Internet Protocol Multimedia Subsystem (IMS), comprising:
   transmitting, by an IMS layer of the terminal, a first request message, to a Non Access Stratum (NAS) layer of the terminal,
   wherein the first request message includes information related to IMS signaling for a non-service attempt and information related to a first access category among a plurality of access categories related to an IMS service,
   wherein the plurality of the access categories are access categories 4, 5, and 6, and
   wherein the IMS signaling for the non-service attempt is signaling that does not request the IMS service;
   transmitting, by the NAS layer of the terminal, a second request message including information related to the first access category to a Radio Resource Control (RRC) layer of the terminal, based on the information related to IMS signaling for the non-service attempt;
   receiving, by the NAS layer of the terminal, a response message indicating that the second request message is barred from the RRC layer of the terminal; and
   based on that the second request message is barred, transmitting, by the NAS layer of the terminal, a third request message including information related to a second access category, which is different from the first access category, among the plurality of the access categories, based on the information related to IMS signaling for the non-service attempt.

2. The method of claim 1, further comprising:
   receiving, by the NAS layer of the terminal, a response message indicating that the third request message is barred from the RRC layer of the terminal.

3. The method of claim 2, further comprising:
   based on the response message indicating that the third request message is barred is received, transmitting, by the NAS layer of the terminal, a fourth request message including information related to a third access category among the plurality of access categories related to the IMS service to the RRC layer of the terminal.

4. The method of claim 1, further comprising:
   storing, by the NAS layer of the terminal, information related to that the first access category is barred, based on that a response message indicating that the second request message is barred is received.

5. The method of claim 1, further comprising:
   receiving, by the NAS layer of the terminal, a response message indicating that the second request message has been accepted from the RRC layer of the terminal.

6. The method of claim 5, further comprising:
   transmitting, by the NAS layer of the terminal, a response message indicating that the first request message has been accepted to the IMS layer of the terminal, based on a response message indicating that the second request message has been accepted is received.

7. The method of claim 1, wherein the second request message further includes information for requesting barring information for a plurality of access categories related to the IMS service to the RRC layer of the terminal.

8. The method of claim 7,
wherein the response message indicating that the second request message is barred includes barring information for a plurality of access categories related to the IMS service,
wherein the barring information for the plurality of access categories includes information related to a barred access category among the plurality of access categories and information related to an allowed access category among the plurality of access categories.

9. The method of claim 1, wherein the non-service attempt is an attempt for any one of initial registration, re-registration, or subscription refresh.

10. The method of claim 1, wherein the IMS service includes at least one of a multimedia telephony (MMTEL) voice related service, an MMTEL video related service, and a Short Message Service (SMS) related service.

11. A wireless communication device comprising:
at least one processor;
at least one transceiver; and
at least one memory storing instructions;
wherein the operations performed based on the execution of the instructions by the at least one processor include:
transmitting, by an IMS layer of the terminal, a first request message, to a Non Access Stratum (NAS) layer of the terminal,
wherein the first request message includes information related to IMS signaling for a non-service attempt and information related to a first access category among a plurality of access categories related to an IMS service,
wherein the plurality of the access categories are access categories 4, 5, and 6,
wherein the IMS signaling for the non-service attempt is signaling that does not request the IMS service, and
wherein the IMS signaling for the non-service attempt is signaling that does not request an IMS service;
transmitting, by the NAS layer of the terminal, a second request message including information related to the first access category to a Radio Resource Control (RRC) layer of the terminal, based on the information related to IMS signaling for the non-service attempt;
receiving, by the NAS layer of the terminal, a response message indicating that the second request message is barred from the RRC layer of the terminal; and
based on that the second request message is barred, transmitting, by the NAS layer of the terminal, a third request message including information related to a second access category, which is different from the first access category, among the plurality of the access categories, based on the information related to IMS signaling for the non-service attempt.

12. The wireless communication device of claim 11, wherein the wireless communication device is an autonomous driving device that communicates with at least one of a mobile terminal, a network, and an autonomous driving vehicle other than the wireless communication device.

13. An apparatus in mobile communication, comprising:
at least one processor; and
at least one memory storing instructions;
wherein the operations performed based on the execution of the instructions by the at least one processor include:
transmitting, by an Internet Protocol Multimedia Subsystem (IMS) layer of the apparatus, a first request message, to a Non Access Stratum (NAS) layer of the apparatus,
wherein the first request message includes information related to IMS signaling for a non-service attempt and information related to a first access category among a plurality of access categories related to the IMS service,
wherein the plurality of the access categories are access categories 4, 5, and 6,
wherein the IMS signaling for the non-service attempt is signaling that does not request an IMS service, and
wherein the IMS signaling for the non-service attempt is signaling that does not request an IMS service;
transmitting, by the NAS layer of the apparatus, a second request message including information related to the first access category to a Radio Resource Control (RRC) layer of the apparatus, based on the information related to IMS signaling for the non-service attempt;
receiving, by the NAS layer of the apparatus, a response message indicating that the second request message is barred from the RRC layer of the apparatus; and
based on that the second request message is barred, transmitting, by the NAS layer of the apparatus, a third request message including information related to a second access category, which is different from the first access category, among the plurality of the access categories, based on the information related to IMS signaling for the non-service attempt.

14. The wireless communication device of claim 11, the operations further comprising:
receiving, by the NAS layer of the terminal, a response message indicating that the third request message is barred from the RRC layer of the terminal.

15. The wireless communication device of claim 14, the operations further comprising:
based on the response message indicating that the third request message is barred is received, transmitting, by the NAS layer of the terminal, a fourth request message including information related to a third access category among the plurality of access categories related to the IMS service to the RRC layer of the terminal.

16. The wireless communication device of claim 11, the operations further comprising:
storing, by the NAS layer of the terminal, information related to that the first access category is barred, based on that a response message indicating that the second request message is barred is received.

* * * * *